United States Patent
Sakoda

(10) Patent No.: US 8,369,797 B2
(45) Date of Patent: Feb. 5, 2013

(54) COMMUNICATION APPARATUS AND COMMUNICATION METHOD, AND COMPUTER PROGRAM THEREFOR

(75) Inventor: Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 825 days.

(21) Appl. No.: 12/410,790

(22) Filed: Mar. 25, 2009

(65) Prior Publication Data

US 2009/0247094 A1 Oct. 1, 2009

(30) Foreign Application Priority Data

Mar. 26, 2008 (JP) ................................ P2008-079576

(51) Int. Cl.
*H04B 1/44* (2006.01)
*H04W 84/12* (2009.01)
*H04W 88/00* (2009.01)

(52) U.S. Cl. ...................... 455/78; 455/552.1; 455/553.1

(58) Field of Classification Search ..................... 455/78, 455/552.1, 553.1, 444
See application file for complete search history.

(56) References Cited

U.S. PATENT DOCUMENTS

| | | |
|---|---|---|
| 2003/0231135 A1 | 12/2003 | Kuroda et al. |
| 2004/0063458 A1 | 4/2004 | Hori et al. |
| 2005/0068934 A1* | 3/2005 | Sakoda ........................ 370/350 |
| 2005/0165916 A1 | 7/2005 | Cromer et al. |
| 2008/0182616 A1* | 7/2008 | Connors et al. ............. 455/552.1 |
| 2008/0194201 A1 | 8/2008 | Sinivaara et al. |
| 2009/0221324 A1* | 9/2009 | Pietila et al. ............... 455/552.1 |
| 2010/0041388 A1* | 2/2010 | Kawasaki .................. 455/422.1 |

FOREIGN PATENT DOCUMENTS

| | | |
|---|---|---|
| CN | 1973487 | 5/2007 |
| JP | 2003-249939 | 5/2003 |
| JP | 2003-304115 | 10/2003 |
| WO | WO 2006/000617 A1 | 1/2006 |

OTHER PUBLICATIONS

Search Report from the European Patent Office, European Application No. EP 09250643.5 mailed Dec. 30, 2009.
First Office Action with English language translation issued by the Patnet Office of the People's Republic of China on May 25, 2011 in corresponding Chinese No. CN 200910129563.

* cited by examiner

*Primary Examiner* — Dean O Takaoka
*Assistant Examiner* — Alan Wong
(74) *Attorney, Agent, or Firm* — Finnegan, Henderson, Farabow, Garrett & Dunner LLP

(57) ABSTRACT

A communication apparatus includes a transmitter for transmitting wireless signals, and a receiver for receiving wireless signals. A first communication functional unit uses the transmitter and the receiver to operate as a station in a first network operating on a first communication channel, while a second communication functional unit uses the transmitter and the receiver to operate as a station in a second network operating on a second communication channel different from that of the first network. A controller conducts time division data transfer by utilizing the respective time periods of receiver inactivity on the first and second channels in order to switch operation to the other channel and attempt to receive a signal on the corresponding other network. In so doing, the communication apparatus is able to fulfill dual roles on the networks operating on different channels with the use of a single modem.

11 Claims, 17 Drawing Sheets

COMMUNICATION APPARATUS AND COMMUNICATION METHOD, AND COMPUTER PROGRAM THEREFOR

BACKGROUND OF THE INVENTION

1. Field of the Invention

The present invention relates to a communication apparatus, a communication method, and a computer program whereby bidirectional communication is conducted among a plurality of wireless stations like those of a wireless LAN (Local Area Network) or PAN (Personal Area Network). More particularly, the present invention relates to a communication apparatus, a communication method, and a computer program able to belong to a plurality of networks operating on different frequency channels.

In further detail, the present invention relates to a communication apparatus, communication method, and computer program that fulfills multiple roles by simultaneously participating in two or more wireless network systems whose logical network topologies and operating frequency channels differ from one another. More particularly, the present invention relates to a dual role communication apparatus, communication method, and computer program that functions as a station operating in an autonomous distributed manner as part of an ad hoc network or mesh network, while also functioning as a client that communicates with an access point as part of a network in infrastructure mode.

2. Description of the Related Art

Wireless networks have been the subject of much attention, being systems free from the physical wiring involved in the wired communication techniques of the past. Such wireless networks typically implement a wireless LAN standard such as IEEE 802.11a (Institute of Electrical and Electronics Engineers 802.11a), IEEE 802.11b, or IEEE 802.11g. Wireless LANs make flexible Internet connection possible, being able to not only replace existing wired LANs, but also to provide a means to connect to the Internet in public places, such as hotel or airport lounges, train stations, and cafes. Wireless LANs have already been broadly adopted, and it is becoming typical for wireless LAN functions to be built into not only IT equipment such as personal computers (PCs), but also CE (consumer electronics) equipment such as digital cameras and music players.

A typical method used to configure a LAN using wireless technology involves installing a single device, referred to as an access point (AP) or coordinator, that acts as the control station for a given area. The network is then formed under unified control by the control station. The control station arbitrates access timings for a plurality of clients within the network, conducting synchronous wireless communication such that respective clients are synchronized with respect to each other.

Another method of configuring a wireless network known as ad hoc communication has also been proposed, wherein all stations operate peer-to-peer in an autonomous distributed manner, and wherein the stations themselves determine access timings. In particular, ad hoc communication is considered to be suited to small-scale networks made up of a relatively small number of stations positioned in close proximity to one another, whereby arbitrary stations are able to conduct direct, asynchronous wireless communication with each other without using a specific control station.

For example, networking in IEEE 802.11 is based on the concept of the BSS (Basic Service Set). BSS exists in two types: BSS, defined to be in "infrastructure mode" wherein a control station is present; and IBSS (Independent BSS), defined to be in "ad hoc mode" and made up of a plurality of MTs (Mobile Terminals, i.e., stations) with no control station.

Furthermore, in addition to the ad hoc networks defined in the IEEE 802.11 specification, development is also proceeding with respect to communication systems wherein respective stations operating in an autonomous distributed manner connect to each other in a peer-to-peer configuration. For example, "multi-hop communication", wherein a plurality of stations relay frames, solves the problem of not all peers being contained within the range that can be reached by a single signal. Thus, a large number of stations are able to connect to each other as a result of a plurality of stations relaying frames to each other in multi-hop communication. Currently, one of the IEEE 802.11 task groups (TGs) is proceeding with work to standardize multi-hop communication. In the present specification, a wireless network that conducts multi-hop communication is referred to as a "mesh network", and the respective stations that constitute the mesh network are referred to as "mesh points" (MPs).

First, network operation in infrastructure mode according to IEEE 802.11 will be described.

In infrastructure mode, the area surrounding an AP that is within the signal range of the AP collectively forms a BSS, thereby forming what is referred to as a cell in a cellular system. Clients (i.e., MTs) present in the proximity of the AP then communicate with the AP and join the network as members of the BSS. More specifically, the AP first transmits a control signal referred to as a beacon at a suitable time interval. MTs capable of receiving the beacon thereby confirm the presence of a nearby AP and subsequently establish a connection with that AP.

FIG. 11 illustrates exemplary operation of an IEEE 802.11 network in infrastructure mode. In the example shown in FIG. 11, the station labeled STA0 is operating as the AP, while the other stations labeled STA1 and STA2 are operating as MTs. As shown in the chart on the right side of FIG. 11, the STA0 acting as the AP transmits a beacon at a fixed time interval. The AP manages the transmission interval of the beacon internally as a parameter referred to as the Target Beacon Transmit Time (TBTT), and activates the beacon transmission procedure every time the current time reaches the TBTT. In addition, the beacon issued by the AP also includes a Beacon Interval field. Using the information from the Beacon Interval field and the time of reception of the beacon itself, nearby MTs are able to determine the next TBTT.

At this point, the BSS may enter a Power Save mode as appropriate, whereby power consumption can be reduced as a result of each MT performing only intermittent operations for receiving signals. In Power Save mode, at least a portion of the MTs in the BSS operate in a Sleep mode, alternating between an Awake state wherein the transceiver is operative, and a Doze state wherein power to the transceiver is cut. Since the MTs are able to determine the transmit time of the next beacon from a received beacon, in Sleep mode an MT may cut power to the receiver and enter a low-power state when not expecting an incoming signal, the low-power state lasting until the next TBTT or until a plurality of TBTT intervals have elapsed. An MT that is not in Sleep mode is referred to as being in Active mode, wherein the transceiver is in continuous operation (see FIG. 12).

The AP centrally manages the timings whereby respective MTs in Sleep mode switch to Awake state, transmitting frames to a particular MT to match the timings whereby that MT enters Awake state. In so doing, the AP supports low-power operation. More specifically, when there exist packets addressed to an MT in Sleep mode, the packets are queued internally rather than immediately transmitted, and information indicating the existence of queued packets is included in the beacon signal to notify the destination MT. The above information that is included in the beacon signal is referred to as the TIM (Traffic Indication Map). An MT in Sleep mode receives and analyzes the beacon signal from the AP, and by referring to the TIM, the MT is able to determine whether or not the AP is buffering traffic addressed to the MT itself. Thus, if an MT in Power Save mode determines that there is traffic to be received, that MT transmits a request signal addressed to the AP that requests the transmission of packets addressed to that MT. Subsequently, the AP transmits the queued data to the MT in response to the request signal.

Network operation in ad hoc mode according to IEEE 802.11 will now be described.

In the ad hoc mode (IBSS) of IEEE 802.11, MTs autonomously define an IBSS upon mutually confirming the presence of a plurality of MTs. The MT group then determines a TBTT at a fixed interval. The beacon transmission interval is announced by means of a parameter within the beacon signal, thereby enabling respective MTs to calculate the next TBTT after having received a beacon signal once. Subsequently, when an individual MT determines that the TBTT has been reached by referring to its internal clock, the MT delays operation for a random amount of time (referred to as a random backoff). If after the random backoff the MT determines that no other MT has yet transmitted a beacon, then the MT transmits a beacon itself. MTs capable of receiving this beacon are then able to join the current IBSS.

FIG. 13 illustrates exemplary operation of an IEEE 802.11 network in ad hoc mode. In the example shown in FIG. 13, the two stations operating as MTs and labeled STA1 and STA2 constitute an IBSS. In this case, either MT belonging to the IBSS may transmit a beacon each time the TBTT is reached. In addition, there also exist cases wherein beacons sent from respective MTs collide.

The IEEE 802.11 specification also describes a Power Save mode for IBSS, whereby MTs are able to cut power to the receiver and enter Doze state as appropriate. A predetermined time period starting from the TBTT is also defined as the ATIM Window (Announcement Traffic Indication Message Window). During the period before the ATIM Window ends, all MTs belonging to the IBSS enter Awake state, and thus even MTs fundamentally operating in Sleep mode are able to receive incoming signals during this time period. In addition, MTs are able to enter Doze state starting from the time the ATIM Window ends and lasting until the next TBTT.

In the case where a particular MT has information to be transmitted to another station, the MT transmits an ATIM packet to the above destination during the ATIM Window. In so doing, the transmitting MT notifies the receiving station that information for transmission is being held. Meanwhile, the MT that receives the ATIM packet activates its receiver and does not enter Doze state until the information from the station that transmitted the ATIM packet has been fully received.

FIG. 14 illustrates exemplary operation in the case where three MTs labeled STA1, STA2, and STA3 are present within an IBSS. When the TBTT is reached, each MT STA1, STA2, and STA3 activates a backoff timer while monitoring the state of the medium for a random amount of time. In the example shown in FIG. 14, the timer in STA1 expires first, and thus STA1 transmits the beacon. Since STA1 has transmitted the beacon, upon receiving the beacon signal STA2 and STA3 refrain from transmitting another beacon signal.

In the present example, STA1 is holding information addressed to STA2, while STA2 is holding information addressed to STA3. In this case, after STA1 has transmitted and STA2 has received the beacon, STA1 and STA2 both respectively activate backoff timers again while monitoring the state of the medium for random amounts of time. In the example shown in FIG. 14, the timer in STA2 expires earlier, and thus STA2 first transmits an ATIM message addressed to STA3. Upon receiving the ATIM message, STA3 briefly waits for an amount of time known as the Short Interframe Space (SIFS), and then replies to STA2 with an ACK (Acknowledge) packet indicating that the ATIM message was received. Once the transmission of the ACK by STA3 is completed, STA1 once again activates a backoff timer while monitoring the state of the medium for a random amount of time, and when the timer expires, STA1 transmits an ATIM packet addressed to STA2. Subsequently, STA2 waits one SIFS and then replies to STA1 with an ACK packet indicating that the ATIM packet was received.

After exchanging ATIM packets and ACK packets as described above, STA3 activates its receiver for the remaining duration of the ATIM Window in order to receive any further information from STA2, while STA2 likewise activates its receiver in order to receive any further information from STA1.

Once the ATIM Window ends, STA1 and STA2, still holding information to be transmitted, subsequently wait for an amount of time referred to as the Distribute Interframe Space (DIFS), an interval corresponding to the minimum amount of time that the medium is idle. After waiting one DIFS, both STA1 and STA2 respectively activate backoff timers while monitoring the state of the medium for random amounts of time. In the example shown in FIG. 14, the timer in STA2 expires earlier, and thus STA2 first transmits a data frame addressed to STA3. Subsequently, after waiting one SIFS, STA3 replies to STA2 with an ACK packet indicating that the data frame was received.

Once transmission of the above data frame is completed, STA1 waits one DIFS, and then once again activates its backoff timer while monitoring the state of the medium for a random amount of time. Once the timer expires, STA1 transmits a data frame addressed to STA2. Subsequently, STA2 waits one SIFS, and then replies to STA1 with an ACK packet indicating that the data frame was received.

In the above sequence, an MT that neither receives an ATIM packet during the ATIM Window nor holds information to be transmitted to another station is able to cut power to its transceiver until the next TBTT, thereby reducing power consumption.

The operation of a mesh network will now be described.

Wireless communication systems have been proposed wherein, for example, respective stations transmit beacons to each other that include network-related information, the information subsequently being used to establish a network. Using such beacons, stations in the wireless communication system are able to conduct high-level decisions with respect to the states of other stations. (See, for example, Japanese Unexamined Patent Application Publication No. 2003-304115). A mesh network can be established using a similar method.

FIG. 15 shows an exemplary communication sequence occurring in a wireless communication system wherein respective stations communicate in an autonomous distributed manner by exchanging beacon signals. In the example shown in FIG. 15, two stations exist within communicable range of each other and herein act as the stations participating in the network. Each station sets a TBTT (Target Beacon Transmission Time) individually, and transmits a beacon signal at regular intervals. In addition, in order to extract information about neighboring MTs, each station also periodically receives the beacon signal from the other station as appropriate.

In addition, it is herein assumed that STA1 enters Sleep mode and cuts power to its transceiver when appropriate, and that an MT in Power Save mode alternates between an Awake state wherein the transceiver is operative, and a Doze state wherein power to the transceiver is cut (as described earlier).

FIG. 16 illustrates an example of how data transmission from STA1 to a station STA0 occurs. The upper part of FIG. 16 shows a packet transfer sequence occurring between STA0 and STA1, while the lower part of FIG. 16 shows the operational state of the STA0 transceiver, STA0 herein acting as the data recipient (in the lower part of FIG. 16, the high level indicates Awake state, and the low level indicates Doze state). Note that when either transceiver is in Doze state, the corresponding station is in Power Save mode. Likewise, when either transceiver is in Awake state, the corresponding station is not in Power Save mode for that period of time.

Once an MT has transmitted a beacon, the MT enters a listen period for a set period of time during which the receiver is operative. If the MT does not receive any traffic addressed to itself during the listen period, then the MT may cut power to the transceiver and switch to Power Save mode. In the example shown in FIG. 16, STA0 transmits the beacon B0-0 and subsequently activates its receiver for a short period. Since STA1 then transmits a packet addressed to STA0 during this period, STA0 is able to receive the packet.

The beacon signal also contains information referred to as the TIM (Traffic Indication Map). The TIM is information notifying whether or not there currently exists addressed to a particular station. By referring to the TIM, a beacon-receiving station is able to determine whether or not that station should receive incoming signals. Each MT periodically receives beacon signals from surrounding MTs and analyzes the TIM therein. If a particular MT confirms that data addressed to itself does not exist, then that MT cuts power to its receiver and enters Sleep mode. If a particular MT confirms that data addressed to itself does exist, then that MT transitions to a data-receiving state without entering Sleep mode.

FIG. 16 illustrates an example wherein the TIM in the beacon B1-1 indicates that STA1 is calling STA0. Upon receiving the beacon, STA0 issues a response to the call (0). Upon receiving the response, STA1 subsequently confirms that STA0 is in a receiving state, and then transmits a packet addressed to STA0 (1). Upon receiving the packet, STA0 confirms that the packet was received normally, and then transmits an ACK (2).

The sequence of received packets with respect to STA0 as indicated by (0), (1), and (2) in FIG. 16 will now be described in further detail.

When a station operating in Power Save mode learns that another station is holding data addressed to itself, the station transmits a poll frame (corresponding to frame (0) in FIG. 16) that triggers transmission by the other station. Two types of poll frames exist: a poll frame that triggers transmission of just one packet (hereinafter referred to as type # A), and a poll frame that allows the sender to transmit a plurality of packets (hereinafter referred to as type # B).

The left side of FIG. 17 illustrates a sequence of received packets wherein a type # A poll frame is used.

Upon receiving a type # A poll frame (0) from STA-0, STA-1 transmits a single data packet (1) in response. The header of the above data packet contains a flag indicating whether or not there exist subsequent packets to be transmitted. Thus, by receiving the data packet from STA-1, STA-0 is able to ascertain whether or not STA-1 wants to subsequently transmit additional packets. In FIG. 17, Data-ct corresponds to the data packet that notifies STA-0 that STA-1 wants to transmit additional packets, while Data-fin corresponds to a data packet indicating that there are no subsequent packets to be transmitted.

In the example shown in FIG. 17, the data packet first transmitted by STA-1 (i.e., Data-ct) notifies STA-0 that there exist subsequent packets. For this reason, after receiving Data-ct normally, STA-0 transmits the type # A poll frame (0) again in order to receive the additional packets. STA-0 then attempts to receive the subsequent frames.

The data packet transmitted by STA-1 in response to the second type # A poll frame is Data-fin, and thus contains information indicating that STA-1 does not wish to transmit any further packets. For this reason, upon receiving Data-fin normally, STA-0 replies with an ACK, terminates the process for receiving the series of data from STA-1, and then transitions back to a state wherein Sleep mode is possible.

The right side of FIG. 17 illustrates a sequence of received packets wherein a type # B poll frame is used.

The transmission of the type # B poll frame (0') by STA-0 implies that STA-0 promises to keep its receiver on until Data-fin is received from STA-1. Upon receiving the type # B poll frame from STA-0, STA-1 replies with an ACK (1') indicating that the above message was correctly received. After this point, STA-1 may transmit any number of Data-ct packets before transmitting Data-fin. The transmission of data to STA-0 is terminated as a result of STA-1 transmitting Data-fin.

By receiving Data-fin from STA-1, STA-0 confirms that STA-1 does not wish to transmit any further packets. Subsequently, STA-0 replies with an ACK, terminates the process for receiving the series of data from STA-1, and then transitions back to a state wherein Sleep mode is possible.

It should be appreciated that a communication sequence similar to that shown in FIG. 17 can be applied to a sequence in infrastructure mode, wherein an MT in Power Save mode receives data from an access point. More specifically, by transmitting a type # A poll frame or type # B poll frame, an MT is able to pull data from the access point.

As described in the foregoing, several different logical network topologies are possible in a wireless LAN system. In addition, there also exist dual role devices, whereby a single physical station is able to logically join a plurality of networks simultaneously.

FIGS. 18 and 19 illustrate how, in a wireless LAN system made up of a plurality of different logical networks, a single physical station fulfills dual roles with respect to two logical networks.

In the example shown in FIG. 18, STA-A constitutes a logical network A, while STA-D constitutes a logical network D. In this communication environment, the single physical station STA-C participates in the network A via the link A-C, while also simultaneously participating in the network D via the link D-C. In this example, it is possible for both the network A and the network D to operate in infrastructure mode, and STA-A and STA-d may both be operating as access points.

In contrast, in the example shown in FIG. 19, the network A may also be operating in ad hoc mode or as an autonomous distributed network such as a mesh network. In this case, the dual role STA-C is able to communicate with the access point STA-D as an MT in the network D, while also communicating directly with the respective stations STA-A and STA-B as either an MT or MP in the other network A.

Consider now the merits of a single physical station fulfilling dual roles by taking as an example the case wherein such a device simultaneously participates in an autonomous distributed network such as an ad hoc network or mesh network, while also participating in a network operating in infrastructure mode.

In. FIG. 19, STA-C is in a state of bidirectional communication with STA-A and STA-B in an autonomous distributed mode, wherein the three stations are herein assumed to be running an application such as a competitive multiplayer game. The present example assumes the case wherein STA-C is controlling the game on the basis of information downloaded from the Internet, while simultaneously proceeding with the competitive multiplayer game with STA-A and STA-B. In this case, STA-C is able to communicate with the access point STA-D in infrastructure mode and thereby download information from the Internet via STA-D, while simultaneously maintaining communication with STA-A and STA-B in an autonomous distributed mode. If a station is able fulfill dual roles and thereby simultaneously participate in a plurality of logical networks as shown by way of example in FIG. 19, then it is anticipated that a great variety of network services can be provided.

Furthermore, although the above plurality of logical networks may be established on the same channel, the networks do not interfere with each other if operated on different channels, and thus it is possible to provide more communication bandwidth. Consequently, there is demand for a dual role device able to belong to a plurality of networks operating on different frequency channels.

However, if a station that fulfills dual roles by belonging to a plurality of networks has only one modem, then that station only transmits and receives on one frequency channel at any given time. For this reason, such a station may be unable to simultaneously participate in different logical networks operating on different frequency channels.

For example, given the wireless LAN system configuration shown in FIG. 18, if the network A and the network D are operating on different frequency channels, and additionally, if the station STA-C belonging to both networks has only one modem, then the link A-C and the link D-C are not established simultaneously. However, in order to improve the connectivity of dual role devices, there is demand for the ability for such a device to belong to a plurality of networks operating on different channels with the use of only one modem.

SUMMARY OF THE INVENTION

The present invention thus provides a communication apparatus, a communication method, and a computer program able to fulfill multiple roles by simultaneously participating in two or more wireless network systems having differing logical network topologies.

The present invention furthermore provides a communication apparatus, a communication method, and a computer program able to optimally fulfill dual roles by functioning as a station operating in an autonomous distributed manner as part of an ad hoc network or mesh network, while also functioning as a client that communicates with an access point as part of a network in infrastructure mode.

The present invention further provides a communication apparatus, a communication method, and a computer program having high connectivity as a dual role device and able to belong to a plurality of networks operating on different channels with the use of only one modem.

Being devised in light of the foregoing problems, a communication apparatus in accordance with an embodiment of the present invention is provided with: a transmitter that transmits wireless signals; a receiver that receives wireless signals; a first communication unit that uses the transmitter and the receiver to operate as a station in a first network operating on a first communication channel; a second communication unit that uses the transmitter and the receiver to operate as a station in a second network operating on a second communication channel different from that of the first network; and a controller that conducts time division data transfer by utilizing the respective time periods of receiver inactivity on the first and second channels in order to switch operation to the other channel and attempt to receive a signal on the corresponding other network.

Methods for establishing a wireless network may include having an access point accommodate one or more MTs like that of the infrastructure mode in IEEE 802.11, or having all stations operate peer-to-peer as MTs or MPs in an autonomous distributed manner. In a wireless LAN system made up of a plurality of logical networks, a single physical station can fulfill dual roles with respect to two logical networks. It is anticipated that having a station simultaneously join a plurality of logical networks will enable the provision of a great variety of network services. In addition, if the above logical networks are respectively made to operate on different frequency channels, then inter-network interference does not occur, and thus more communication bandwidth can be provided.

However, if the dual role device has only one modem, then that station only transmits and receives on one frequency channel at any given time. For this reason, such a station may be unable to simultaneously participate in different logical networks operating on different frequency channels. In order to improve the connectivity of dual role devices, there is demand for the ability for such a device to belong to a plurality of networks operating on different channels with the use of only one modem.

In this respect, a communication apparatus in accordance with an embodiment of the present invention is able to operate as a dual role device. For example, the communication apparatus may be configured to conduct time division data transfer during the intermittent receive operations on one of the networks, wherein the communication apparatus utilizes the time periods of receiver inactivity on the same channel in order to switch operation to a different channel and attempt to receive a signal. In so doing, the station corresponding to the communication apparatus is able to belong to networks operating on a number of channels greater than the number of modems provided in the station itself, thereby enabling the provision of more communication bandwidth while additionally increasing connectivity.

On each individual logical network herein, the communication apparatus may periodically transmit beacons itself, or alternatively, receive beacons periodically transmitted by neighboring stations, thereby helping to establish the operation of each network. However, since the respective logical networks are not fundamentally synchronized with respect to one another, there is a problem in that the target time for transmitting or receiving a beacon on one network might overlap with the target time for transmitting or receiving a beacon on another network.

A communication apparatus in accordance with an embodiment of the present invention is thus configured to prioritize its own beacon transmit processing when the beacon transmit time on one network overlaps with the beacon receive time on the other network. The reason for the above is due to concern regarding the situation wherein neighboring stations on one of the networks are expecting to receive a beacon from the station corresponding to the communication apparatus. If such a beacon signal does not arrive at the neighboring stations, then the neighboring stations may mistakenly assume that the station corresponding to the communication apparatus has disappeared from the network, and network operation may break down as a result. In contrast, even if a station temporarily fails to receive a beacon signal periodically transmitted by the neighboring stations on the other network, network operation is still easily maintained as long as a transmitted beacon signal is received before or after the beacon in question.

In addition, a communication apparatus in accordance with an embodiment of the present invention is configured such that when the apparatus is fulfilling dual roles on two logical networks and the respective target times for receiving beacons from stations on each network overlap, the apparatus prioritizes the processing to receive the beacon signal of the network whereon signals of greater bandwidth are being transferred, while aborting the processing to receive the beacon signal of the other network. Such operation is equivalent to prioritizing the network operation that has generated the most recent traffic. In other words, the dual role device is configured to prioritize, on the basis of past traffic history, reception of the beacon for the network more likely to generate future traffic. In so doing, it is projected that the probability of traffic congestion occurring will also be low. Although reception of the beacon on the other network fails one time as a result, the effects of this failure merely cause traffic delivery on the other network to be delayed by an amount of time equal to the beacon transmit period. Moreover, since the probability of traffic being generated on the other network is itself projected to be low, the above does not pose a significant problem.

In some cases, the beacon transmit times from other stations on either network may overlap. In such cases, if there exists an event occurring on one of the networks that can be detected by some procedure other than inspection of past traffic history (such as the scheduled transmission of broadcast traffic or multicast traffic, for example), then the dual role device may also be configured to prioritize reception of the scheduled broadcast traffic or multicast traffic, rather than following the above procedure based on traffic history.

In addition, it is preferable to configure a communication apparatus in accordance with an embodiment of the present invention such that, when the communication apparatus is attempting to receive data from neighboring stations during the intermittent receive operations on one of the logical networks, the communication apparatus modifies the activation procedure for receiving data according to the amount of time remaining until the next scheduled time for transmitting or receiving on the other logical network, thereby enabling the communication apparatus to fulfill both of its roles with respect to either logical network. More specifically, while the station is receiving a data frame buffered in another station on one of the networks and additionally has confirmed the existence of subsequent data frames, the station also operates such that, when the scheduled time for transmitting or receiving a beacon on the other network approaches, the station aborts reception of the current data frame, switches channels, and then executes processing to receive or transmit a beacon on the other network.

In addition, a computer program in accordance with another embodiment of the present invention is a computer program written in a computer-readable format so as to execute, on a computer, processing for controlling communication operations with respect to a communication apparatus provided with a transceiver that transmits and receives wireless signals. The computer program causes the computer to function as: a first communication unit that uses the transceiver to operate as a station in a first network operating on a first communication channel; a second communication unit that uses the transceiver to operate as a station in a second network operating on a second communication channel different from that of the first network; and a controller that conducts time division data transfer by utilizing the respective time periods of receiver inactivity on the first and second channels in order to switch operation to the other channel and attempt to receive a signal on the corresponding other network.

The computer program in accordance with another embodiment of the present invention is defined to be a computer program written in a computer-readable format so as to realize predetermined processing upon a computer. Stated differently, the computer program in accordance with another embodiment of the present invention may be installed on a computer so as to realize coordinated action upon the computer and thereby obtain operational advantages similar to those of a communication apparatus in accordance with an embodiment of the present invention.

According to embodiments of the present invention, there are provided a communication apparatus, a communication method, and a computer program able to fulfill multiple roles by simultaneously participating in two or more wireless network systems whose logical network topologies and operating frequency channels differ from one another.

In addition, according to embodiments of the present invention, there are provided a communication apparatus, a communication method, and a computer program able to optimally fulfill dual roles by functioning as a station operating in an autonomous distributed manner as part of an ad hoc network or mesh network, while also functioning as a client that communicates with an access point as part of a network in infrastructure mode.

In addition, according to embodiments of the present invention, there are provided a communication apparatus, a communication method, and a computer program having high connectivity as a dual role device and able to belong to a plurality of networks operating on different channels with the use of only one modem.

According to embodiments of the present invention, a dual role device is configured such that, when the beacon receive times on either network to which the device is joined are overlapping, the dual role device prioritizes, on the basis of past traffic history, reception of the beacon for the network more likely to generate future traffic. In so doing, it is projected that the probability of traffic congestion occurring will also be low.

Other features and advantages of the present invention will become more apparent upon reading of the following detailed description and accompanying drawings.

DESCRIPTION OF THE PREFERRED EMBODIMENTS

Hereinafter, embodiments of the present invention will be described in detail and with reference to the accompanying drawings.

In the embodiments to be hereinafter described, the communication pathway is taken to be a wireless pathway wherein each logical network operates on a different frequency channel. In addition, the communication in these embodiments is taken to be store and forward traffic, with information being forwarded on a packet basis. Furthermore, the processing executed by the stations to be hereinafter described is not limited to the case wherein all stations participating in the network execute such processing. It is sufficient if just the station simultaneously belonging to at least a plurality of logical networks executes such processing.

Figure 1:
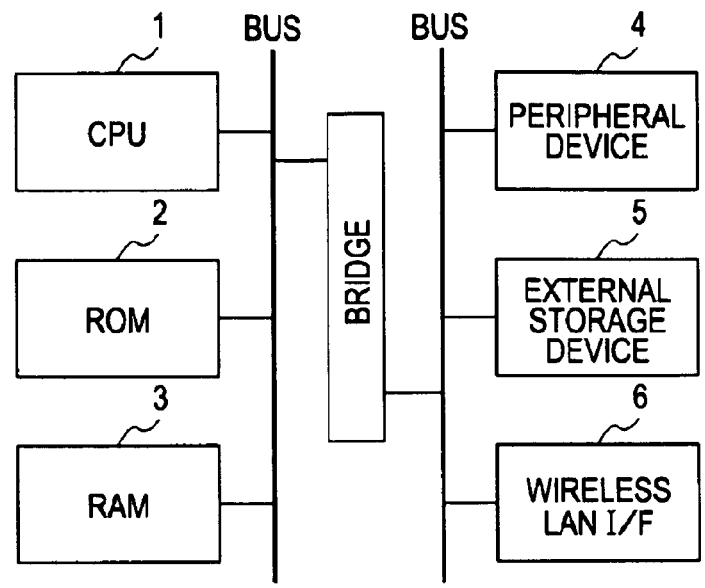
FIG. 1 is a schematic illustration of the hardware configuration of a wireless apparatus in accordance with an embodiment of the present invention.

FIG. 1 schematically illustrates the hardware configuration of a wireless device in accordance with an embodiment of the present invention. The wireless device herein may be IT equipment such as a personal computer having an on-board wireless LAN card, or CE equipment such as a digital camera or music player.

In the wireless device shown in FIG. 1, a CPU (Central Processing Unit) 1 is mutually connected via a bus to memory such as ROM (Read-Only Memory) 2 and RAM (Random Access Memory) 3, while peripheral components such as a peripheral device 4, an HDD (Hard Disk Drive) or similar external storage device 5, and a wireless LAN interface 6 are likewise mutually connected via a bus. In addition, the two or more buses are joined via a bridge.

The CPU 1 loads into the RAM 3 control code stored in the ROM 2 (i.e., a non-transitory storage medium) or program code that has been installed on the external storage device 5 (i.e., a non-transitory storage medium), and then executes such code. In so doing, the CPU 1 controls the overall operation of the wireless device, including device operation that uses the peripheral device 4 (such as, for example, video recording or playback operations in a digital camera, or playlist display and music playback operations in a music player), and communication operations that use the wireless LAN interface 6.

Figure 2:
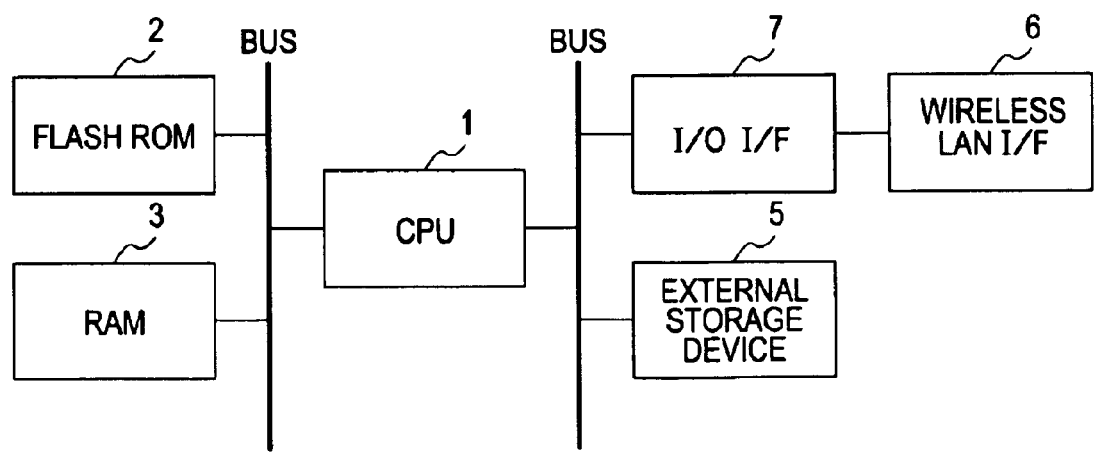
FIG. 2 is a schematic illustration of the hardware configuration of a wireless apparatus in accordance with another embodiment of the present invention.

In the example shown in FIG. 1, the wireless LAN interface 6 is configured to pass IEEE 802.11 MAC (Media Access Control) frames to the RAM 3, with MAC layer processing being subsequently conducted by the CPU 1. However, the scope of the present invention is not limited to a wireless device configuration like that shown in FIG. 1, and a different configuration, like that shown in FIG. 2, is also conceivable. In FIG. 2, the wireless LAN interface 6 is connected to a bus via an I/O interface 7. The I/O interface 7 connecting the wireless LAN interface 6 to the bus is typically an MSIO (Memory Stick IO), SDIO (Secure Digital IO), or USB (Universal Serial Bus) interface. In this case, the wireless LAN interface 6 is configured to process the IEEE 802.11 MAC (Media Access Control) layer, and then transmit IEEE 802.3-equivalent frames to the host CPU 1 via the I/O interface 7.

IT equipment like that shown in FIGS. 1 and 2 is thus provided with a wireless LAN interface 6 and performs dual roles, functioning both as a station operating in an autonomous distributed manner as, for example, an MT (Mobile Terminal) operating on an ad hoc network or an MP (Mesh Point) operating on a mesh network, while additionally functioning as a client that communicates with an access point on a network operating in infrastructure mode. By means of the two logical communication interfaces, a great variety of network services can be provided to the device. Herein, a plurality of different logical networks is taken to fundamentally operate on respectively different frequency channels. In addition, IT equipment like that shown in FIGS. 1 and 2 is assumed to be battery-driven, wherein driving power is supplied from a battery (not shown). Consequently, such IT equipment may also be provided with a charger for charging the battery, wherein charging operations by the charger are controlled by solving for the remaining charge of the battery from the voltage at the output terminal thereof.

Figure 3:
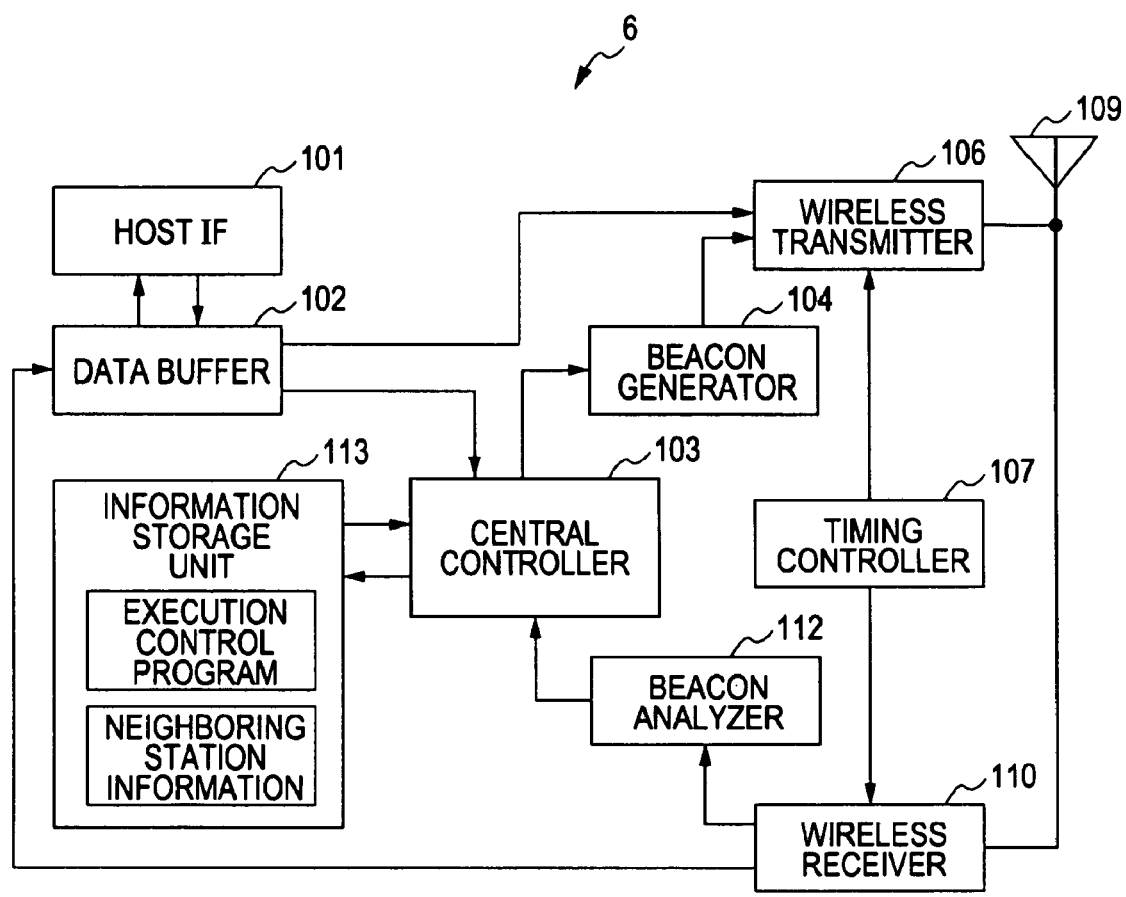
FIG. 3 illustrates an exemplary internal configuration of a wireless interface 6.

FIG. 3 illustrates an exemplary internal configuration of the wireless LAN interface 5. The wireless LAN interface 6 shown in FIG. 3 has dual roles. In the first role, the wireless LAN interface 6 operates as an MT in an autonomous distributed communication environment wherein no control station is present. By conducting effective channel access within the same wireless system, the wireless LAN interface 6 is able to help form a network while avoiding collisions. In the second role, the wireless LAN interface 6 functions as a client that communicates with an access point in a network operating in infrastructure mode.

As shown in FIG. 3, the wireless LAN interface 6 acting as a station herein is provided with a host interface 101, a data buffer 102, a central controller 103, a beacon generator 104, a wireless transmitter 106, a timing controller 107, an antenna 109, a wireless receiver 110, a beacon analyzer 112, and an information storage unit 113.

The host interface 101 exchanges various information with the host equipment (see FIG. 1 or 2) connected to the I/O interface 7.

The data buffer 102 is used to temporarily store data sent from the host equipment connected via the host interface 101, or to temporarily store data received via the wireless transmission pathway before transmission to the host interface 101.

The central controller 103 executes a predetermined executable program and thereby provides unified control over sequential information transmit and receive processes conducted in the wireless LAN interface 6 acting as a station herein, while also controlling access to the transmission pathway.

In the present embodiment, the central controller 103 realizes the dual roles of functioning as a station operating in an autonomous distributed manner and functioning as a client that communicates with an access point on a network operating in infrastructure mode. The central controller 103 thus performs processing for providing a great variety of network-services by means of two logical communication interfaces.

The beacon generator 104 generates beacon signals that are periodically exchanged among nearby stations. In order for a wireless device provided with the wireless LAN interface 6 to operate on a wireless network, the wireless device specifies its own beacon transmit times as well as the beacon receive times for beacons from neighboring stations. This beacon time information is stored in the information storage unit 113, while additionally being included in the beacon signal and announced to neighboring stations. Since each station transmits a beacon at the beginning of the transmission frame period, the transmission frame period on a given channel is defined by the beacon interval.

The wireless transmitter 106 conducts predetermined modulation processing in order to wirelessly transmit data and beacon signals being stored temporarily in the data buffer 102. The wireless receiver 110 conducts processing to receive signals such as information or beacons sent from other stations at particular times.

Various communication methods applicable to wireless LAN and suitable for relatively short-range communication may be implemented as the wireless transmission method used in the wireless transmitter 106 and the wireless receiver 110. More specifically, techniques such as UWB (Ultra Wide Band), OFDM (Orthogonal Frequency Division Multiplexing), and CDMA (Code Division Multiple Access) may be implemented.

The antenna 109 wirelessly transmits a signal addressed to another station on a set frequency channel, or alternatively, receives a signal arriving from another station. In the present embodiment, a single antenna is shared by the transceiver (i.e., the wireless transmitter 106 and the wireless receiver 110), and thus transmission and reception are not simultaneously conducted in parallel.

The timing controller 107 controls timings for the transmission and reception of wireless signals. For example, the timing controller 107 may control the beacon transmit timing when the wireless device transmits its own beacon at the beginning of the transmission frame period, the beacon receive timing for receiving beacons from neighboring stations, the data transmit and receive timings for transferring data to and from neighboring stations, and the scan period.

The beacon analyzer 112 analyzes a beacon signal received from a neighboring station to determine the presence of nearby stations, including hidden nodes. For example, the TBTT or other beacon timing information for a neighboring station may be extracted from the beacon signal and subsequently stored in the information storage unit 113 as neighboring station information.

The information storage unit 113 stores sequential executable instructions (such as a program describing a collision avoidance processing sequence) for performing a series of access control operations that are executed by the central controller 103, while also storing other information such as neighboring station information obtained from the analysis results with respect to a received beacon.

The IT equipment shown in FIGS. 1 and 2 thus performs dual roles, functioning both as a station operating in an autonomous distributed manner as an MT (Mobile Terminal) operating on an ad hoc network or an MP (Mesh Point) operating on a mesh network, while additionally functioning as a client that communicates with an access point on a network operating in infrastructure mode. The IT equipment thus operates as a station to which a great variety of network services can be provided by means of the two logical communication interfaces. Furthermore, such equipment can be made to consume less power by operating with a minimum level of functionality, without having the entire plurality of logical communication interfaces set to an On state.

Figure 4:
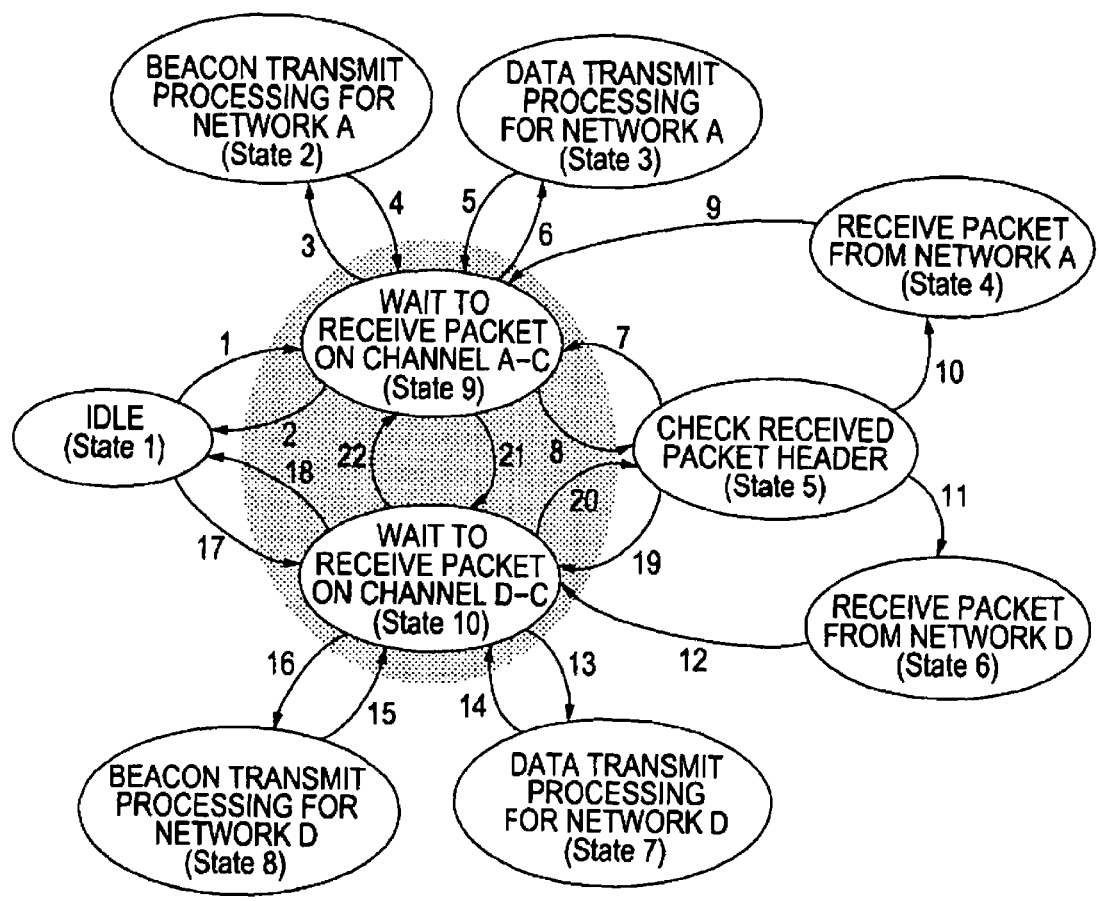
FIG. 4 is a state diagram for a dual role device that functions as a station operating in an autonomous distributed manner, while also functioning as a client in infrastructure mode.

FIG. 4 illustrates the state transitions of such a station. The station represented in FIG. 4 is taken to be operating as a dual role station STA-C in the communication system shown in FIG. 18, wherein STA-C is participating both in a network A operating on a channel A-C, as well as a network D operating on a channel D-C. The channels A-C and D-C herein are furthermore taken to be fundamentally different frequency channels.

Hereinafter, communication operations conducted by the single physical station STA-C will be described with reference to FIG. 4, the communication operations herein being conducted in order for STA-C to simultaneously participate in the network A as an MT or an MP in an autonomous distributed manner, while also participating in the network D operating in infrastructure mode.

The dual role station STA-C transitions between an idle state (State 1) and a state of waiting to receive packets (state 9), with the station STA-C alternating between the above states primarily by means of timer control (indicated by the state transition arrows 1 and 2). The type of event whereby the state transition timer is controlled will be later described in detail.

For example, the station STA-C may first be in the idle state (State 1), but enter a state of waiting to receive packets on channel A-C (State 9) in order to enter a state of communication with the station STA-A on the network A (indicated by the state transition arrow 1).

When operating in Sleep mode, the station STA-C spends the duration of the state of waiting to receive packets (State 9) alternating between an Awake state wherein the transceiver is activated, and a Doze state wherein power to the transceiver is cut. The station STA-C thus intermittently performs receive operations.

For example, while in the state of waiting to receive packets (State 9), the station STA-C may, by means of timer control, initiate beacon transmit processing for network A (State 2) every time the network A-addressed beacon transmit time is reached. Once the transmit processing is terminated, the station STA-C may then return to the state of waiting to receive packets (State 9). (The above is indicated by the state transition arrows 3 and 4.)

In addition, when a packet transmit request addressed to a station on network A is generated while in the state of waiting to receive packets (State 9), the station STA-C initiates data transmit processing for network A (State 3). Once the transmit processing is terminated, the station STA-C returns to the state of waiting to receive packets (State 9). (The above is indicated by the state transition arrows 5 and 6.)

If the station STA-C receives a packet from another station while in the state of waiting to receive packets (State 9), then the station STA-C conducts a received packet header check (State 5) (indicated by the state transition arrow 8). At this point, if the received packet is a packet from a station on network A, then the station STA-C performs processing to receive a packet from network A (State 4), and subsequently returns to the state of waiting to receive packets (State 9). (The above is indicated by the state transition arrows 10 and 9).

Meanwhile, the station STA-C also alternates between a state of waiting to receive packets on channel A-C (State 9) and a state of waiting to receive packets on channel D-C (State 10) by means of timer control (indicated by the state transition arrows 21 and 22). In so doing, the station STA-C is able to conduct time division-based provision of services on the two channels A-C and D-C.

While in the state of waiting to receive packets on the channel D-C (State 10), the station STA-C initiates, by means of timer control, beacon transmit processing for network D (State 8) every time the network D-addressed beacon transmit time is reached (indicated by the state transition arrows 15 and 16). However, in the case where the network D is operating in infrastructure mode and the station STA-C is accommodated as a client by an access point STA-D, the beacon transmit processing (State 8) is not initiated.

In addition, when a packet transmit request addressed to a station on network D is generated while in the state of waiting to receive packets (State 10), the station STA-C initiates data transmit processing for network D (State 7). Once the transmit processing is terminated, the station STA-C returns to the state of waiting to receive packets (State 10). (The above is indicated by the state transition arrows 13 and 14.)

If the station STA-C receives a packet from another station while in the state of waiting to receive packets (State 10), then the station STA-C conducts a received packet header check (State 5) (indicated by the state transition arrow 20). At this point, if the received packet is a packet from a station on network D, then the station STA-C performs processing to receive a packet from network D (State 6), and subsequently returns to the state of waiting to receive packets (State 10). (The above is indicated by the state transition arrows 11 and 12).

Figure 5:
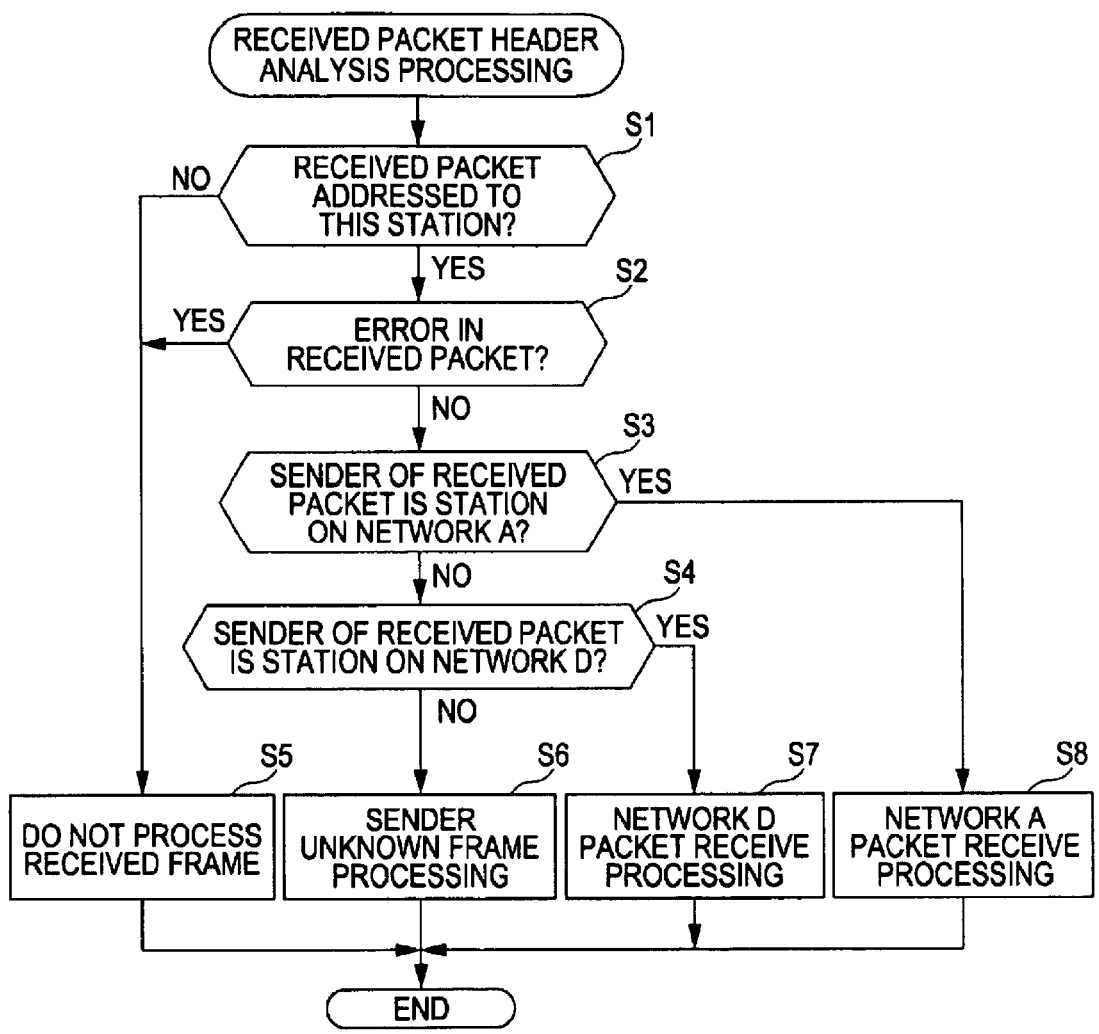
FIG. 5 is a flowchart illustrating the sequence of a received packet header analysis process that is implemented in the state 35 of the state diagram shown in FIG. 4.

FIG. 5 illustrates, in flowchart form, the sequence of processes for analyzing the header of a received packet that are performed during State 5 of the state diagram shown in FIG. 4. The present process routine is initiated when any type of packet is received from any one of the neighboring stations while the receiving station is in a state of waiting to receive packets (i.e., State 9 or 10).

Upon receiving a packet, the dual role station initiates access control processing and first checks the destination of the received packet. More specifically, the dual role station checks whether or not the received packet is explicitly addressed to itself, or alternatively, is a broadcast packet, multicast packet, or similar packet addressed to an unspecified large number of recipients (step S1).

Subsequently, if it is determined that the received packet is explicitly addressed to the examining station, or alternatively, is a broadcast packet, multicast, or similar packet addressed to an unspecified large number of recipients (step S1: Yes), then the examining station judges itself to be a recipient of the packet and proceeds to the next step. On the other hand, if the station judges itself to not be a recipient of the packet (step S1: No), then the received packet is not processed (step S5), and the process is terminated.

Subsequently, the station determines whether or not an error has occurred with respect to the received packet (step S2). It should be appreciated that this error determination may be conducted before or after checking information such as the packet destination or sender. Similarly, if it is apparent that an error has occurred with respect to the received packet (step S2: Yes), then the received packet is not processed (step S5), and the process is terminated.

If an error has not occurred with respect to the received packet (step S2: No), then the station subsequently determines which of its networks the sender of the received packet belongs to.

At this point, if the sender of the received packet is a transmitting station on network A (i.e., if the sender is another MT participating in the autonomous distributed network) (step S3: Yes), then the process proceeds to step S4, and the packet is processed as being received on network A.

If the sender of the received packet is a transmitting station on network D (i.e., if the sender is operating as an access point on the network in infrastructure mode) (step S4: Yes), then the process proceeds to step S6, and the packet is processed as being received on network D.

In the case where the sender belongs to neither network (step 34: No), the packet is processed as a frame with an unknown sender, being received from a station not in communication with the receiving station.

As described thus far, the dual role station STA-C simultaneously participates as an MT on an autonomous distributed network while also connecting to an access point as a client in infrastructure mode, and thus is able to provide a great variety of network services. In addition, if the above two logical networks are made to respectively operate on the different channels A-C and D-C, then inter-network interference does not occur, and thus more communication bandwidth can be provided.

However, if the station STA-C has only one modem, then the station only transmits and receives on one frequency channel at any given time. For this reason, the station may be unable to simultaneously participate in different logical networks operating on different frequency channels. In order to improve the connectivity of the dual role station, it is desirable to enable the station to belong to networks operating on different channels with the use of only one modem.

Consequently, in the present embodiment, the dual role station STA-C is configured as follows. When the station STA-C is conducting intermittent receive operations while in the state of waiting for packets on the autonomous distributed network A (State 9), for example, the station STA-C also conducts time division data transfer, wherein the station STA-C utilizes the time periods of receiver inactivity on the channel A-C in order to transition to the state of waiting for packets on the other network D (State 10) and attempt to receive a signal on the other channel D-C. In so doing, the station STA-C is able to belong to networks operating on a number of channels greater than the number of modems provided in the station itself, thereby enabling the provision of more communication bandwidth while additionally increasing connectivity.

Figure 18:
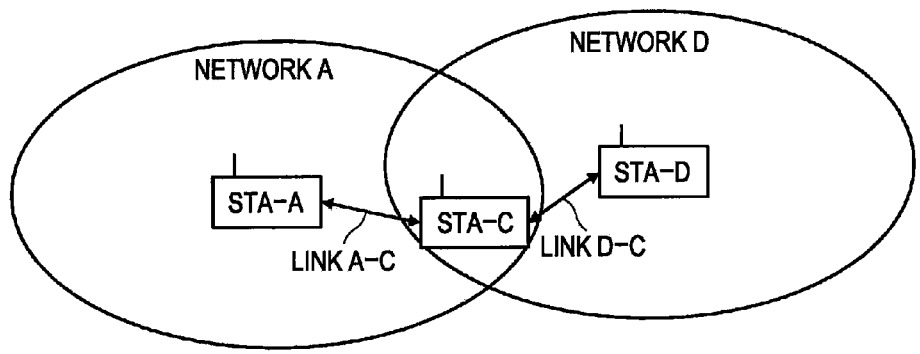
FIG. 18 illustrates how, in a wireless LAN system made up of a plurality of different logical networks, a single physical station fulfills dual roles with respect to two logical networks.
Figure 19:
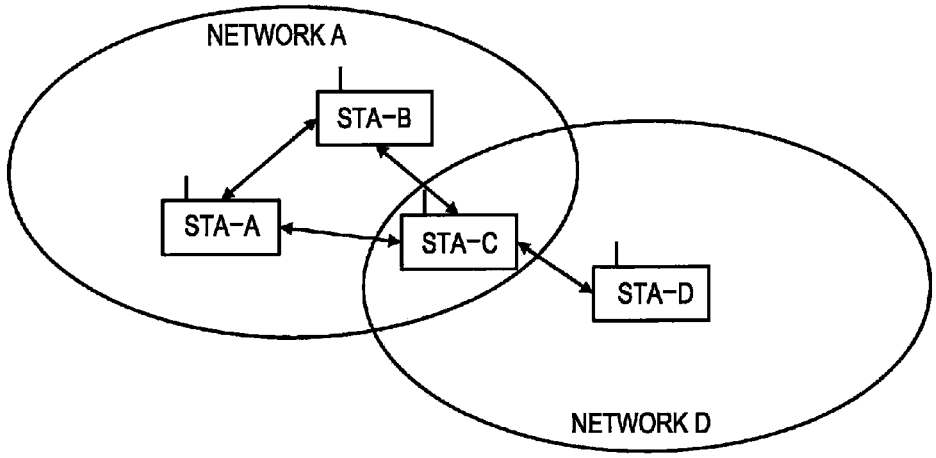
FIG. 19 illustrates how, in a wireless LAN system made up of a plurality of different logical networks, a single physical station fulfills dual roles with respect to two logical networks.

In the wireless LAN system shown in FIG. 18, the station STA-C fulfills dual roles by means of time division, autonomously communicating as an MT on the network A, while also connecting to an access point as a client on network D.

Figure 11:
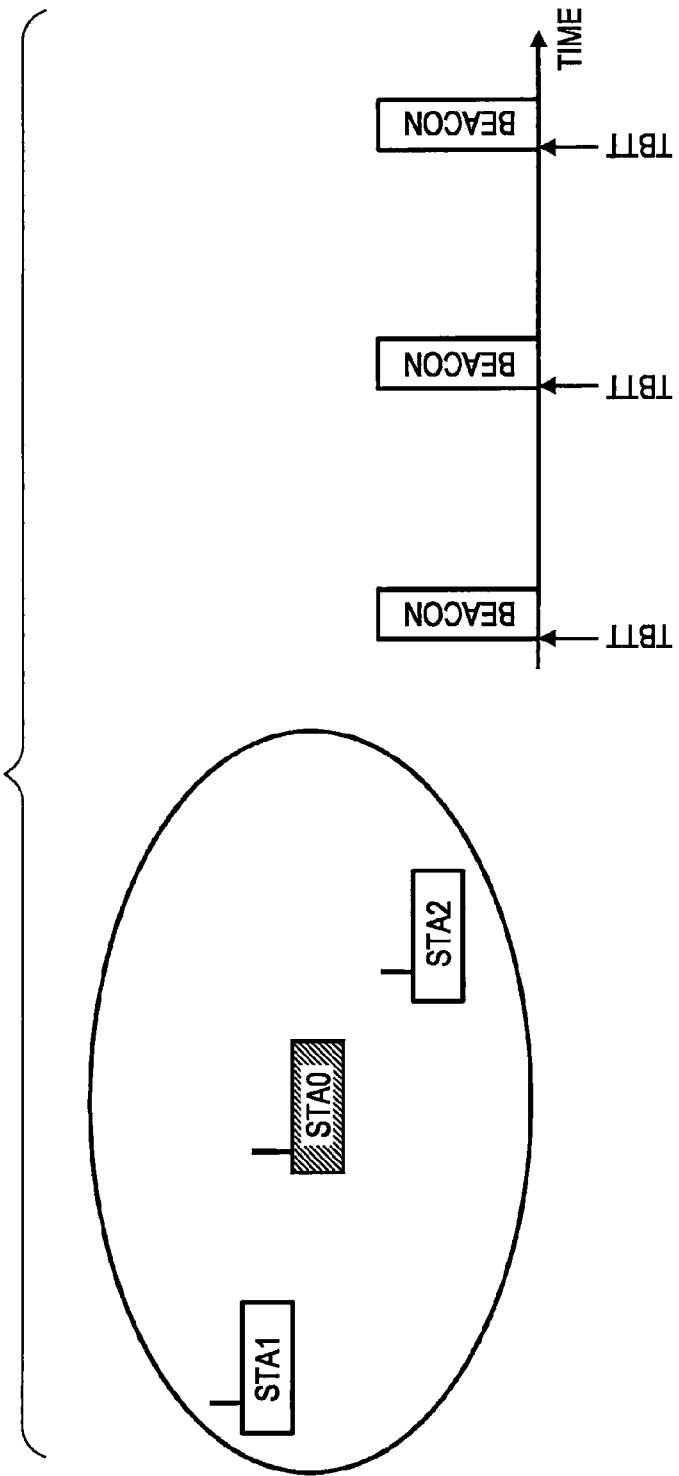
FIG. 11 illustrates exemplary operation of an IEEE 802.11 network in infrastructure mode.
Figure 12:
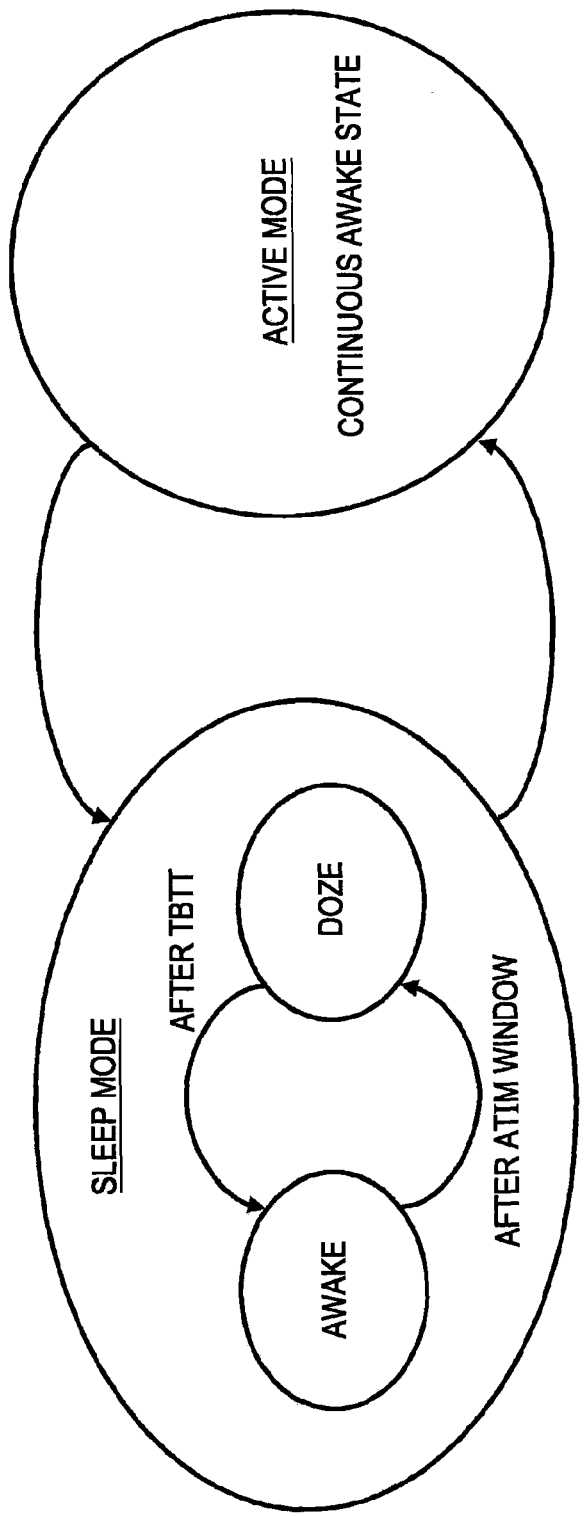
FIG. 12 is a state diagram for explaining the low-power operation of a station operating as an MT.
Figure 13:
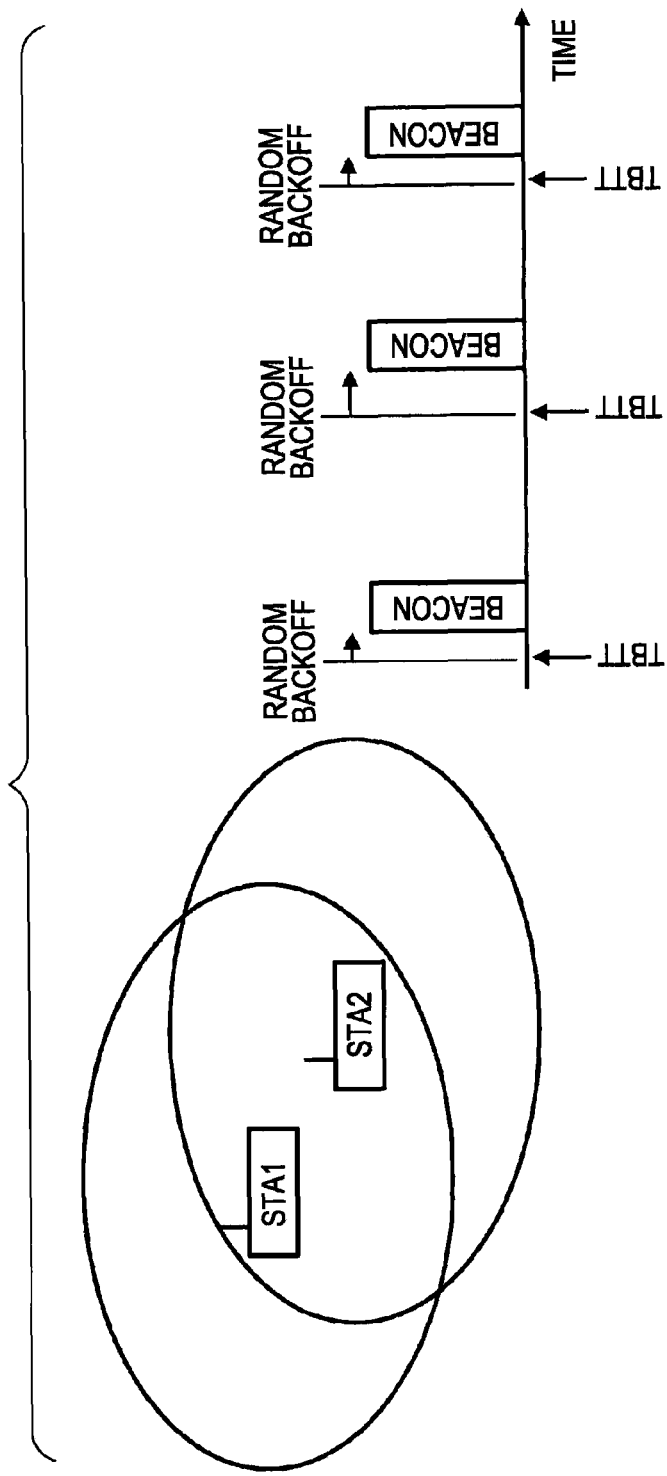
FIG. 13 illustrates exemplary operation of an IEEE 802.11 network in ad hoc mode.
Figure 14:
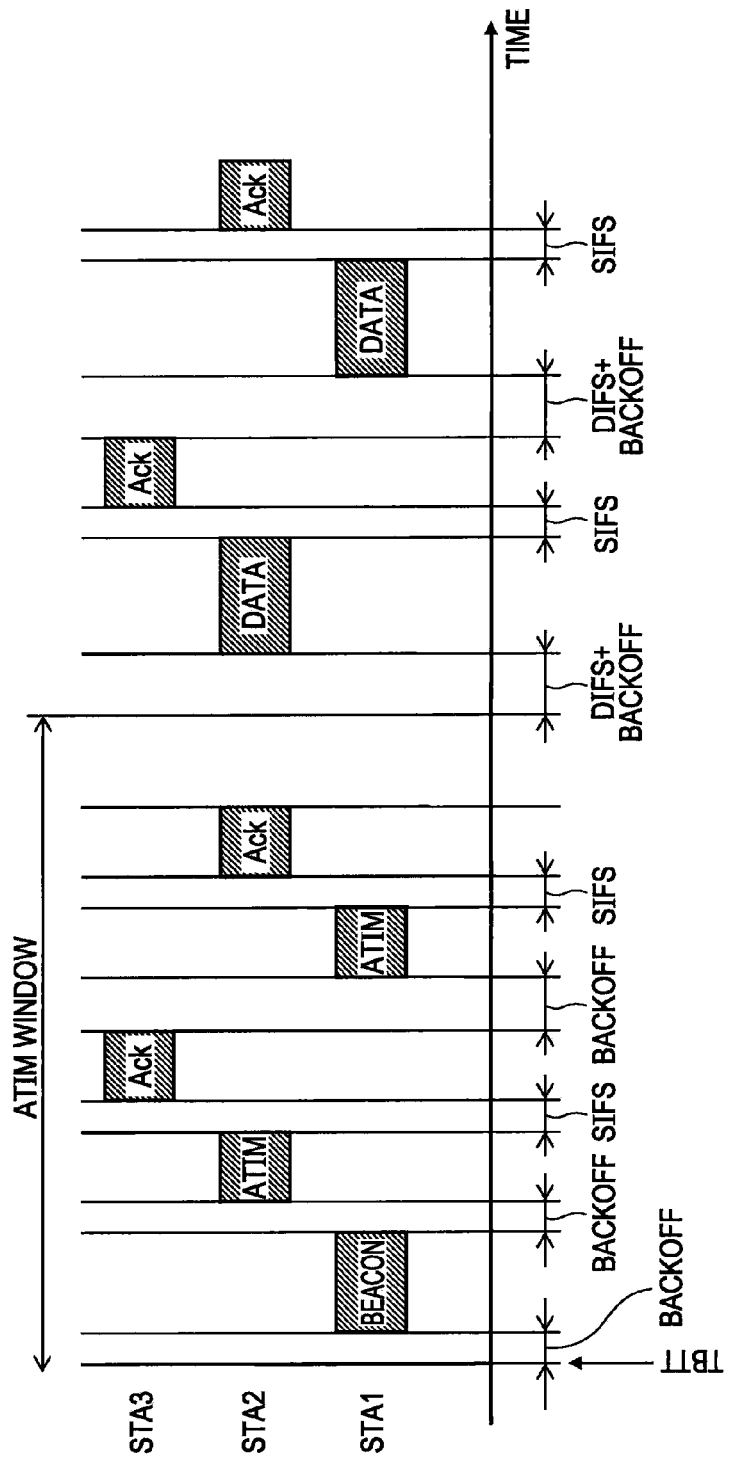
FIG. 14 illustrates exemplary operation in the case where three MTs STA1, STA2, and STA3 are present within an IBSS.
Figure 15:
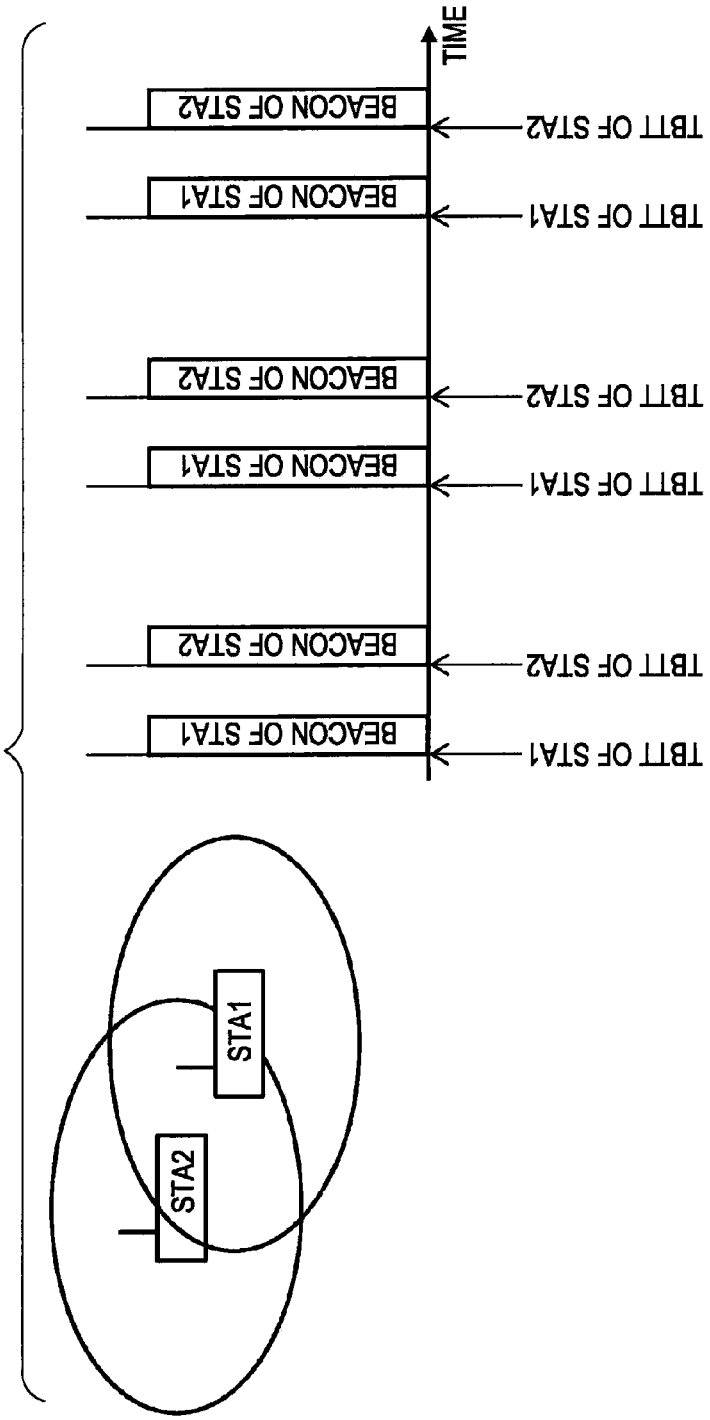
FIG. 15 illustrates an exemplary communication sequence occurring in a wireless communication system wherein respective beacons communicate in an autonomous distributed manner by exchanging beacon signals.
Figure 16:
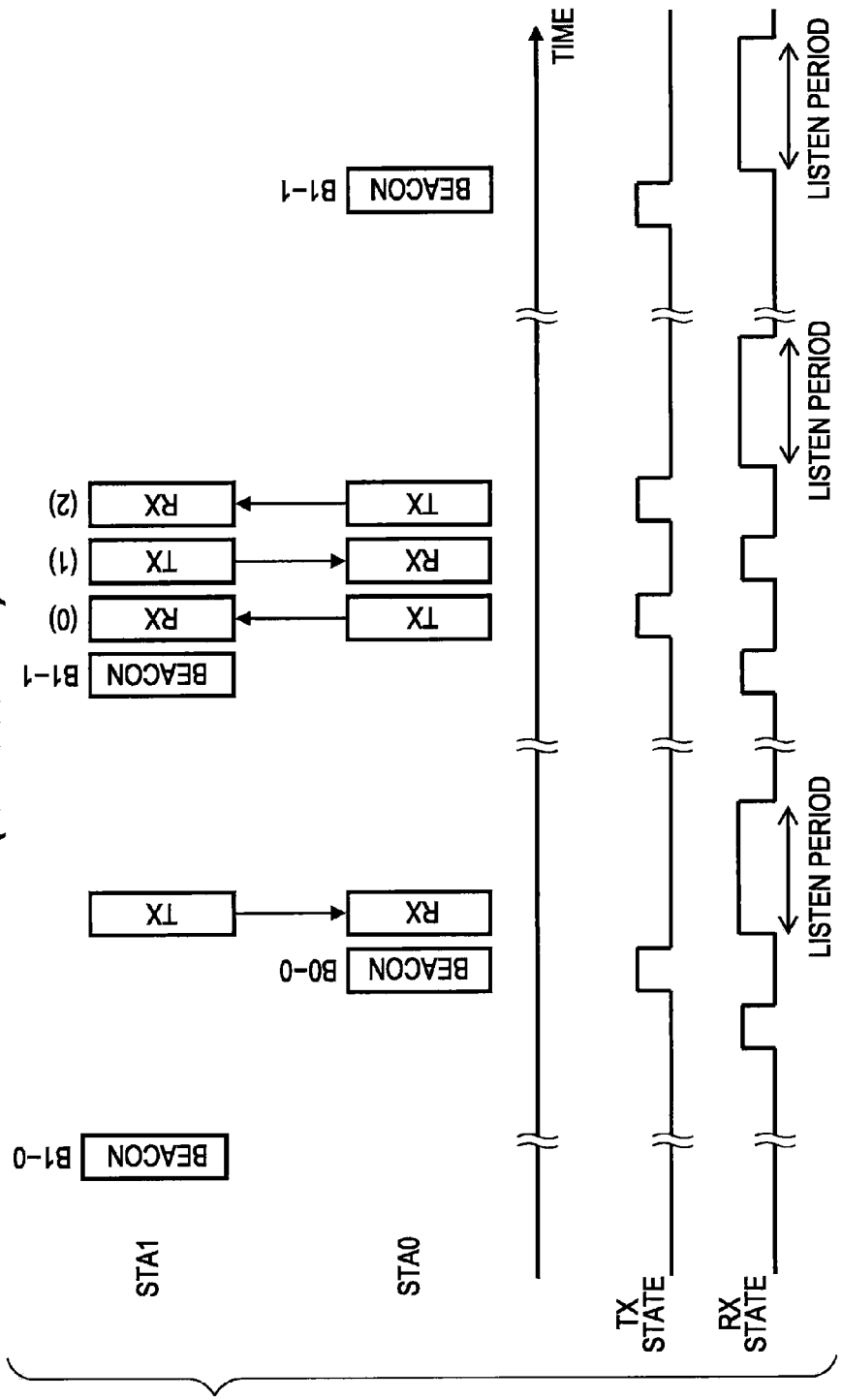
FIG. 16 illustrates how data transmission from STA1 to STA0 occurs, while also illustrating the operational state of the receiver in the data recipient STA0.
Figure 17:
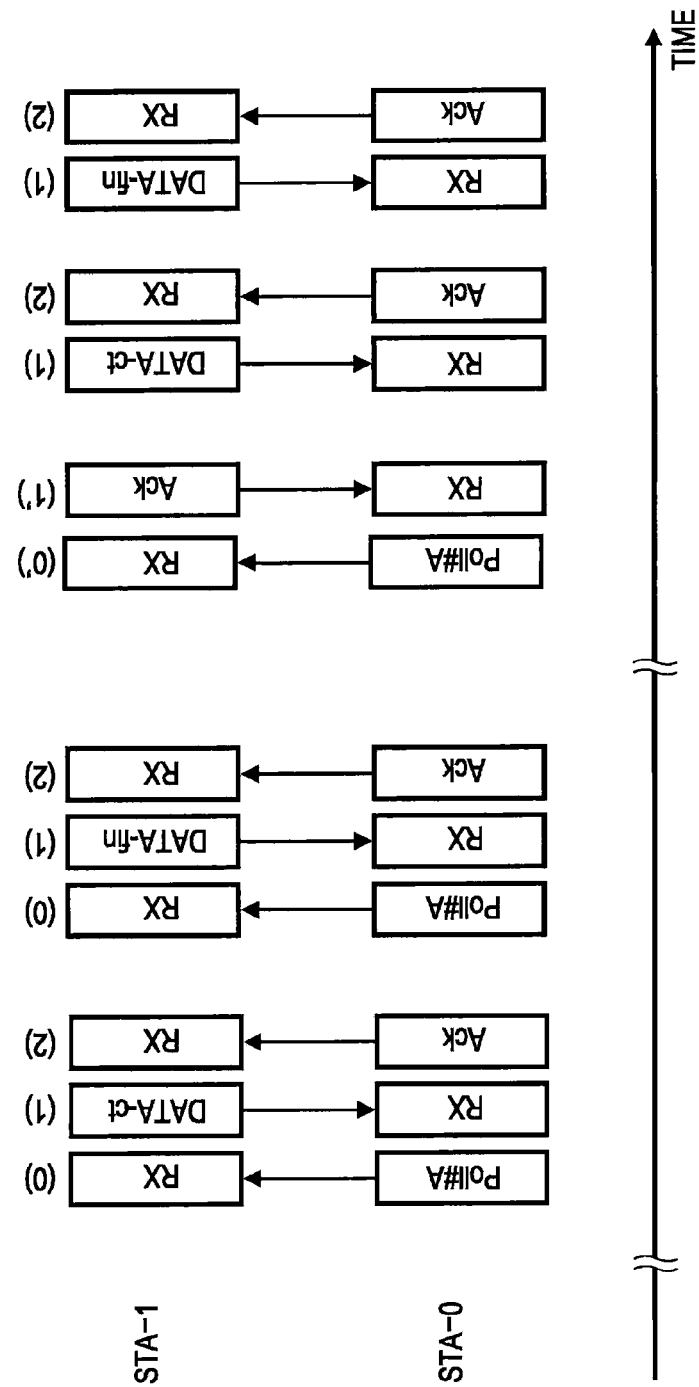
FIG. 17 illustrates sequences of received packets wherein poll frames are used.

As described with reference to FIGS. 13 and 15, the autonomous distributed network A herein is operated as a result of its respective stations periodically transmitting beacon signals and thereby becoming loosely synchronized to one another. In contrast, as described with reference to FIG. 11, in the network D operating in infrastructure mode, a client is accommodated by an access point by listening to the beacon signals periodically transmitted by that access point. Since the network A and the network D are not fundamentally synchronized, there exist several problems with regard to causing the station STA-C to operate by means of time division over a plurality of networks respectively operating on different channels.

For example, it is possible for the transmit time of beacon transmitted by the station STA-D acting as the access point on the network D (or in other words, the time at which the station STA-C receives the beacon) to overlap the transmit time at which the STA-C itself transmits a beacon on the network A.

In such a case, the station STA-C is configured to prioritize beacon transmission on the network A and initiate beacon transmit processing, while aborting reception of the beacon from the access point STA-D on the network D. The reason for the above is due to concern regarding the situation wherein the neighboring station STA-A on the autonomous distributed network A is expecting to receive a beacon from the station STA-C. If such a beacon signal does not arrive at the station STA-C, then the station STA-A may mistakenly assume that the station STA-C has disappeared from the network, and communication conducted while establishing a connection may break down as a result. In contrast, it is possible to sustain network operation on the network D as long as the access point STA-D does not continuously detect whether or not each client has received the beacon signal transmitted by STA-D, and additionally, as long as the client STA-C is able to receive a beacon signal transmitted by the access point STA-D before or after the beacon in question. (In other words, network operation can still be sustained even if STA-C does not receive the beacon signal every time.)

Stated in terms of the state diagram shown in FIG. 4, even when provisionally in the state of waiting to receive packet on channel D-C (State 10), the station STA-C switches channels when the beacon transmit timer for channel A-C expires, and then gives priority to initiating the beacon transmit processing for network A (State 2). (The above is indicated by the state transition arrows 22 and 3.)

Even in the case where the other network D is not operating in infrastructure mode and is instead an autonomous distributed network like network A, the station STA-C is still configured to prioritize processing for transmitting its own beacon over processing for receiving beacons from other stations.

Meanwhile, it is also possible that the scheduled times for receiving beacons from other stations on both the network A and the network D may overlap.

In such a case, the STA-C is configured to prioritize the processing for receiving the beacon signal of the network whereon signals of greater bandwidth are being transferred, while aborting the processing for receiving the beacon signal on the other network. Such operation is equivalent to prioritizing operation of the network that has generated the most recent traffic. In other words, the station STA-C is configured to prioritize, on the basis of past traffic history, reception of the beacon for the network more likely to generate future traffic. In so doing, it is projected that the probability of traffic congestion occurring will also be low. Although the station STA-C fails once to receive the beacon on the other network as a result, the effects of this failure merely cause traffic delivery on the other network to be delayed by an amount equal to the beacon transmit period. Moreover, since the probability of traffic being generated on the other network is itself projected to be low, the above does not pose a significant problem.

In addition, the station STA-C is preferably configured such that, when attempting to receive data from the neighboring station STA-A while conducting intermittent receive operations in the state of waiting to receive packets on the autonomous distributed network A (State 9), the station STA-C modifies the activation procedure for receiving data according to the amount of time remaining until the next scheduled time for transmitting or receiving on the other network D, thereby enabling the station STA-C to fulfill both of its roles with respect to both networks A and D.

More specifically, while the station is receiving traffic buffered in another station on one of the networks and additionally has confirmed the existence of subsequent traffic, the station also operates such that, when the scheduled time for transmitting or receiving a beacon on the other network approaches, the station aborts reception of the current data frame, switches channels, and then executes processing to receive or transmit a beacon on the other network.

Figure 6:
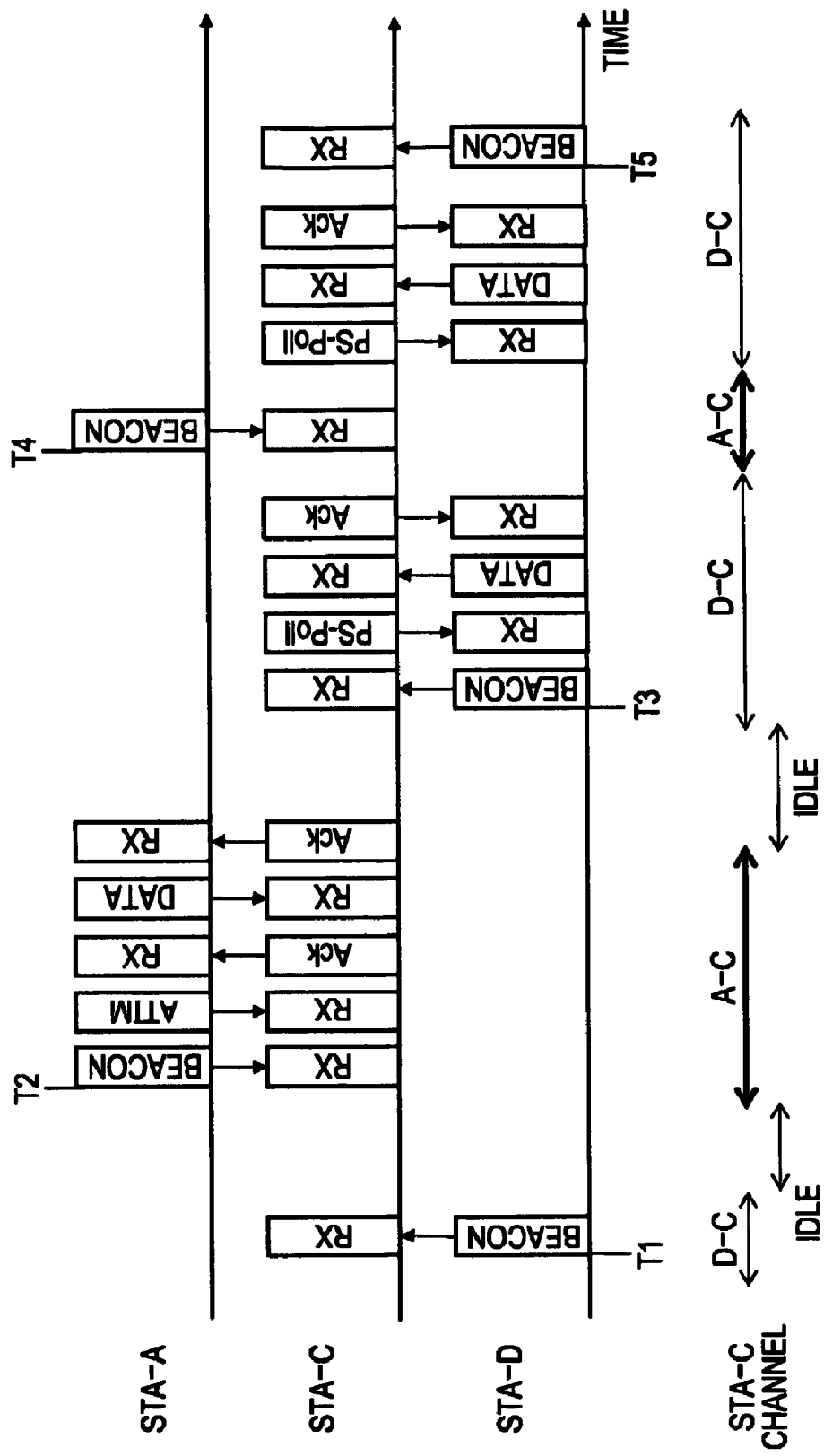
FIG. 6 illustrates an exemplary communication sequence occurring in the communication system shown in FIG. 18, in the case where the station STA-C is simultaneously participating in a network A as an MT or MP in an autonomous distributed manner, while also communicating with an access point STA-D on a network D operating in infrastructure mode.

FIG. 6 illustrates an exemplary communication sequence occurring in the communication system shown in FIG. 18, in the case where the station STA-C is simultaneously participating in the network A as an MT or MP in an autonomous distributed manner, while also being accommodated on the network D operating in infrastructure mode. As shown in FIG. 18, STA-A belongs to the network A and communicates with STA-C in a peer-to-peer configuration. Meanwhile, the network D is operated by a station STA-D acting as an access point, with STA-C being connected to this access point. In addition, the network A and the network D are herein taken to operate on different frequency channels.

The access point STA-D periodically transmits beacons on network D. In the exemplary communication sequence shown in FIG. 6, STA-D transmits beacons at the times T1, T3, and T5. On the autonomous distributed network A, the station STA-A belonging thereto also periodically transmits beacons. In the exemplary communication sequence shown in FIG. 6, STA-A transmits beacons at the times T2 and T4. The lower part of FIG. 6 illustrates how, in such conditions, the STA-C participates in both networks and fulfills dual roles by selecting frequency channels and attempting to receive signals.

When STA-D's beacon transmit time T1 approaches, the station STA-C sets its receiver to the channel used in the link D-C, and attempts to receive the beacon arriving from STA-D. Subsequently, upon analyzing the beacon received at time T1 and discovering that no there is no incoming traffic addressed to itself, the station STA-C turns its receiver off and enters an idle state in order to reduce power consumption.

Subsequently, when STA-A's beacon transmit time T2 approaches, the station STA-C sets its receiver to the channel used in the link A-C, and attempts to receive the beacon arriving from STA-A (obviously, the STA-C itself also transmits beacons on the network A, but such operation is omitted from FIG. 6 for the sake of convenience).

If, during the ATIM Window that lasts for a predetermined amount of time starting from the beacon transmit time (as described earlier), the station STA-C receives an ATIM frame from STA-A and discovers the existence of incoming packets addressed to itself, then the STA-C maintains receiver operation and subsequently receives incoming data frames from STA-A. After receiving all data frames from STA-A, the station STA-C turns its receiver off and enters an idle state in order to reduce power consumption.

Subsequently, when STA-D's beacon transmit time T3 approaches, the station STA-C sets its receiver to the channel used in the link D-C, and attempts to receive the beacon arriving from STA-D.

At this point, if the station STA-C analyzes the beacon received at time T3 and discovers the existence of incoming traffic addressed to itself, then the station STA-C subsequently transmits a PS-Poll frame addressed to the access point STA-D and announcing that STA-C is ready to receive the traffic addressed to itself. Subsequently, upon receiving the PS-Poll frame, the access point STA-D transmits its buffered data frames addressed to STA-C. This Power Save sequence using a PS-Poll frame follows the IEEE 802.11 specification.

Although the station STA-C has confirmed that there still exist data frames buffered in the access point STA-D, STA-A's beacon transmit time T4 is approaching, and for this reason the station STA-C subsequently aborts reception of the succeeding data frames, sets its receiver to the channel used in the link A-C, and attempts to receive the beacon from the neighboring station STA-A.

Subsequently, since the station STA-C does not receive a frame during the ATIM Window, the station STA-C determines that currently there are no incoming packets on network A (i.e., from STA-A).

Next, in order to resume reception of the succeeding data frames from STA-D, the station STA-C sets its receiver to the channel used in the link D-C, while additionally transmitting a PS-Poll frame addressed to the sender STA-D in order to receive traffic. In response to receiving the PS-Poll frame, STA-D then transmits its buffered data frames addressed to STA-C.

Figure 7:
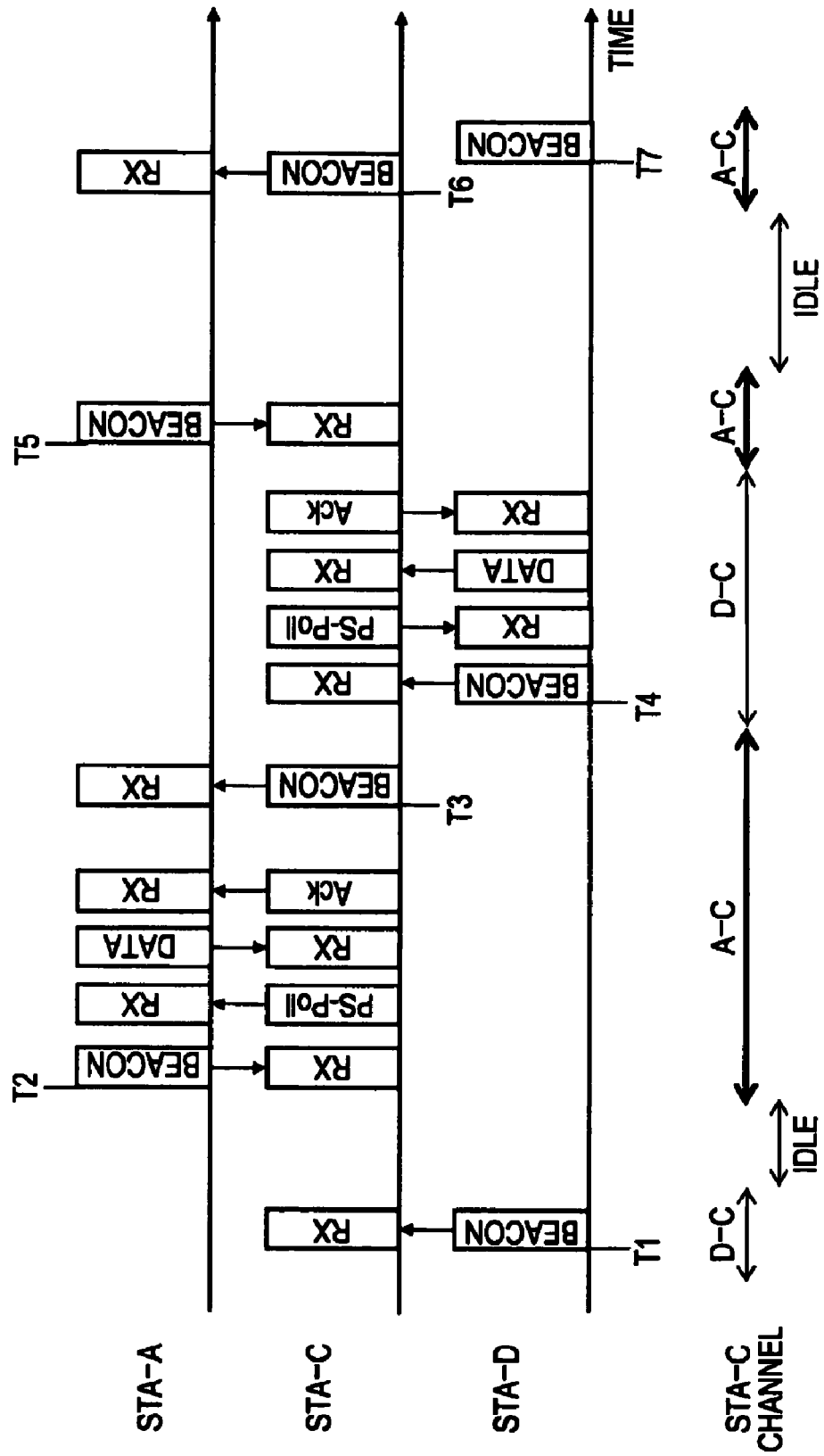
FIG. 7 illustrates another exemplary communication sequence occurring in the communication system shown in FIG. 18, in the case where the station STA-C is simultaneously participating in a network A as an MT or MP in an autonomous distributed manner, while also communicating with an access point STA-D on a network D operating in infrastructure mode.

FIG. 7 illustrates another exemplary communication sequence occurring in the communication system shown in FIG. 18, in the case where the station STA-C is simultaneously participating in the network A as an MT or MP in an autonomous distributed manner, while also being accommodated by an access point STA-D on the network D operating in infrastructure mode. Furthermore, the network A and the network D are herein taken to operate on different frequency channels (same as above).

The access point STA-D periodically transmits beacons on network D. In the exemplary communication sequence shown in FIG. 7, STA-D transmits beacons at the times T1, T4, and T7. On the autonomous distributed network A, the station STA-C belonging thereto also periodically transmits beacons. In the exemplary communication sequence shown in FIG. 7, STA-C transmits beacons at the times T3 and T6. Similarly, the station STA-A also periodically transmits beacons on the network A. In the exemplary communication sequence shown in FIG. 7, STA-A transmits beacons at the times T2 and T5. The lower part of FIG. 7 illustrates how, in such conditions, the STA-C participates in both networks and fulfills dual roles by selecting frequency channels and attempting to receive signals.

When STA-D's beacon transmit time T1 approaches, the station STA-C sets its receiver to the channel used in the link D-C, and attempts to receive the beacon arriving from STA-D. Upon analyzing the beacon received at time T1 and discovering that there is no incoming traffic addressed to itself, the STA-C subsequently turns its receiver off and enters an idle state in order to reduce power consumption.

Next, when STA-A's beacon transmit time T2 approaches, the station STA-C sets its receiver to the channel used in the link A-C, and receives the beacon arriving from STA-A. Upon analyzing the received beacon information and discovering the existence of incoming traffic addressed to itself, the station STA-C transmits a PS-Poll frame addressed to STA-A and announcing that STA-C is ready to receive the traffic addressed to itself. In response to receiving the PS-Poll frame, the STA-A transmits its buffered data frames to STA-C.

Subsequently, upon reaching the time T3, the STA-C transmits a beacon over the network A on the frequency channel of the link A-C, and then activates its receiver on the frequency channel of the link A-C for an amount of time equal to the listen period. The station STA-C does not receive a signal during the listen period, and thus when STA-D's beacon transmit time T4 approaches, STA-C sets its receiver to the channel used in the link D-C, and attempts to receive the beacon from STA-D.

Upon analyzing the beacon received at time T4 and discovering the existence of incoming traffic addressed to itself, the station STA-C transmits a PS-Poll frame addressed to STA-D and announcing that STA-C is ready to receive the traffic addressed to itself. Upon receiving the PS-Poll frame, the STA-D transmits its buffered frames addressed to STA-C.

Since the neighboring station STA-A's beacon transmit time T5 is now approaching, the station STA-C subsequently aborts reception of the succeeding data frames from STA-D, sets its receiver to the channel used in the link A-C, and attempts to receive the beacon from STA-A. Upon analyzing the received beacon and determining that there is no traffic addressed to itself, the STA-C then turns its receiver off and enters an idle state in order to reduce power consumption.

At this point, the station STA-C would normally transmit its own beacon over the network A at time T6, while also receiving a beacon from STA-D at time T7. However, the station STA-C detects that the time T6 and the time T7 are in close proximity to one another and chronologically overlap. In this case, the station STA-C is configured to prioritize transmission of its own beacon, and transmits a beacon on the channel used in the link A-C. In so doing, the station STA-C is able to maintain communication on network A.

In addition, the station STA-C also fails to receive the beacon from STA-D at time T7 as a result of prioritizing the transmission of its own beacon. Even assuming that STA-D had been buffering traffic addressed to STA-C, the effects of the station STA-C failing once to receive the beacon merely cause the delivery of traffic addressed to STA-C to be delayed by an amount of time equal to the beacon transmit period. Moreover, since the probability of traffic being generated on the other network is itself projected to be low, the above is not thought to pose a significant problem. It should also be appreciated that in order to simplify explanation herein, the above describes, by way of example, the case wherein a station receives a beacon signal from a neighboring station every time. However, in some cases a station may receive a beacon only once over a span of intervals, in order to further reduce power consumption. In such cases, processing similar to that described above may be executed when the receive timings occurring once over a span of intervals overlap.

Figure 8:
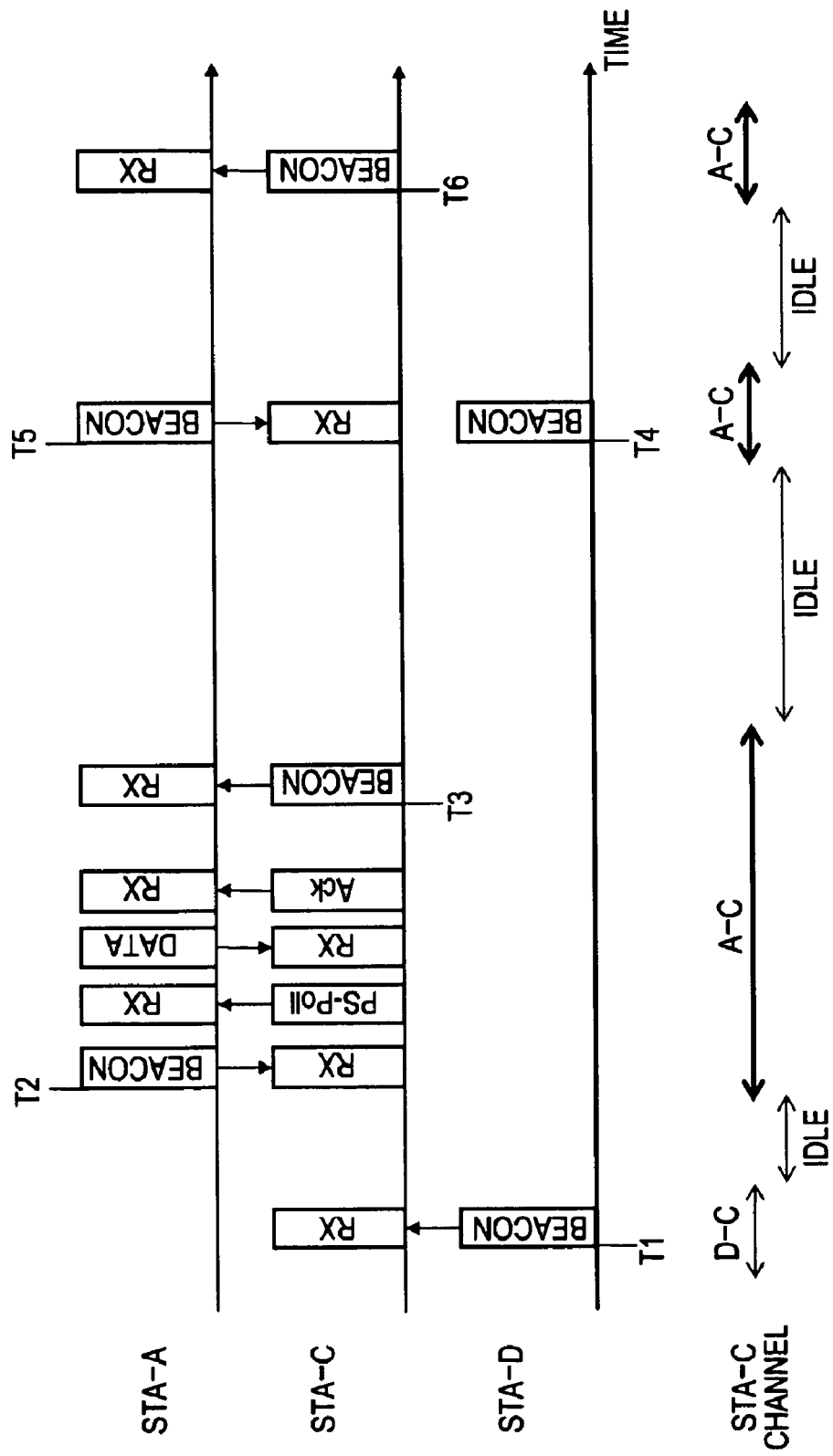
FIG. 8 illustrates another exemplary communication sequence occurring in the communication system shown in FIG. 18, in the case where the station STA-C is simultaneously participating in a network A as an MT or MP in an autonomous distributed manner, while also communicating with an access point STA-D on a network D operating in infrastructure mode.

FIG. 8 illustrates another exemplary communication sequence occurring in the communication system shown in FIG. 18, in the case where the station STA-C is simultaneously participating in the network A as an MT or MP in an autonomous distributed manner, while-also being accommodated by an access point STA-D on the network D operating in infrastructure mode. Furthermore, the network A and the network D are herein taken to operate on different frequency channels (same as above).

The access point STA D periodically transmits beacons on network D. In the exemplary communication sequence shown in FIG. 8, STA-D transmits beacons at the times T1 and T4. On the autonomous distributed network A, the station STA-C belonging thereto also periodically transmits beacons. In the exemplary communication sequence shown in FIG. 8, STA-C transmits beacons at the times T3 and T6. Similarly, the station STA-A also periodically transmits beacons on the network A. In the exemplary communication sequence shown in FIG. 8, STA-A transmits beacons at the times T2 and T5. The lower part of FIG. 8 illustrates how, in such conditions, the STA-C participates in both networks and fulfills dual roles by selecting frequency channels and attempting to receive signals.

When STA-D's beacon transmit time approaches, the station STA-C sets its receiver to the channel used in the link D-C, and attempts to receive the beacon arriving from STA-D. Upon analyzing the beacon received at time T1 and discovering that there is no incoming traffic addressed to itself, the station STA-C subsequently turns its receiver off and enters an idle state in order to reduce power consumption.

Next, when STA-A's beacon transmit time T2 approaches, the station STA-C sets its receiver to the channel used in the link A-C, and receives the beacon arriving from STA-A. Upon analyzing the received beacon information and discovering the existence of incoming traffic addressed to itself, the station STA-C transmits a PS-Poll frame addressed to STA-A and announcing that STA-C is ready to receive the traffic addressed to itself. In response to receiving the PS-Poll frame, STA-A transmits its buffered frames to STA-C.

Subsequently, upon reaching the time T3, the station STA-C transmits a beacon over the network A on the frequency channel of the link A-C, and then operates its receiver on the frequency channel of the link A-C for an amount of time equal to the listen period. The station STA-C does not receive a signal during the listen period, and thus STA-C turns its receiver off and enters an idle state in order to reduce power consumption.

At this point, the station STA-C would normally receive a beacon from STA-A on network A at time T5, while also receiving a beacon from STA-D at time T4. However, the STA-C detects that the time T4 and the time T5 are in close proximity to one another and chronologically overlap. In such cases, the station STA-C refers to the traffic history up to this point, and decides which channel upon which to receive a beacon.

In the example shown in FIG. 8, traffic exchange is occurring more frequently with STA-A than with STA-D. Consequently, the station STA-C prioritizes reception of the beacon from STA-A, activating its receiver on the channel used in the link A-C prior to time T5, and then receiving the beacon from STA-A. In so doing, the station STA-C is able to maintain communication on the network A.

In addition, the station STA-C also fails to receive the beacon from STA-D at time T4 as a result of prioritizing reception of the beacon from the station STA-A. Even assuming that STA-D had been buffering traffic addressed to STA-C, the effects of the station STA-C failing once to receive the beacon merely cause the delivery of traffic addressed to STA-C from STA-D to be delayed by an amount of time equal to the beacon transmit period. Moreover, since the probability of traffic being generated on network D is itself projected to be low, the above is not thought to pose a significant problem. It should also be appreciated that in order to simplify explanation herein, the above describes, by way of example, the case wherein a station receives a beacon signal from a neighboring station every time. However, in some cases a station may receive a beacon only once over a span of intervals, in order to further reduce power consumption. In such cases, processing similar to that described above may be executed when the receive timings occurring once over a span of intervals overlap.

Figure 9:
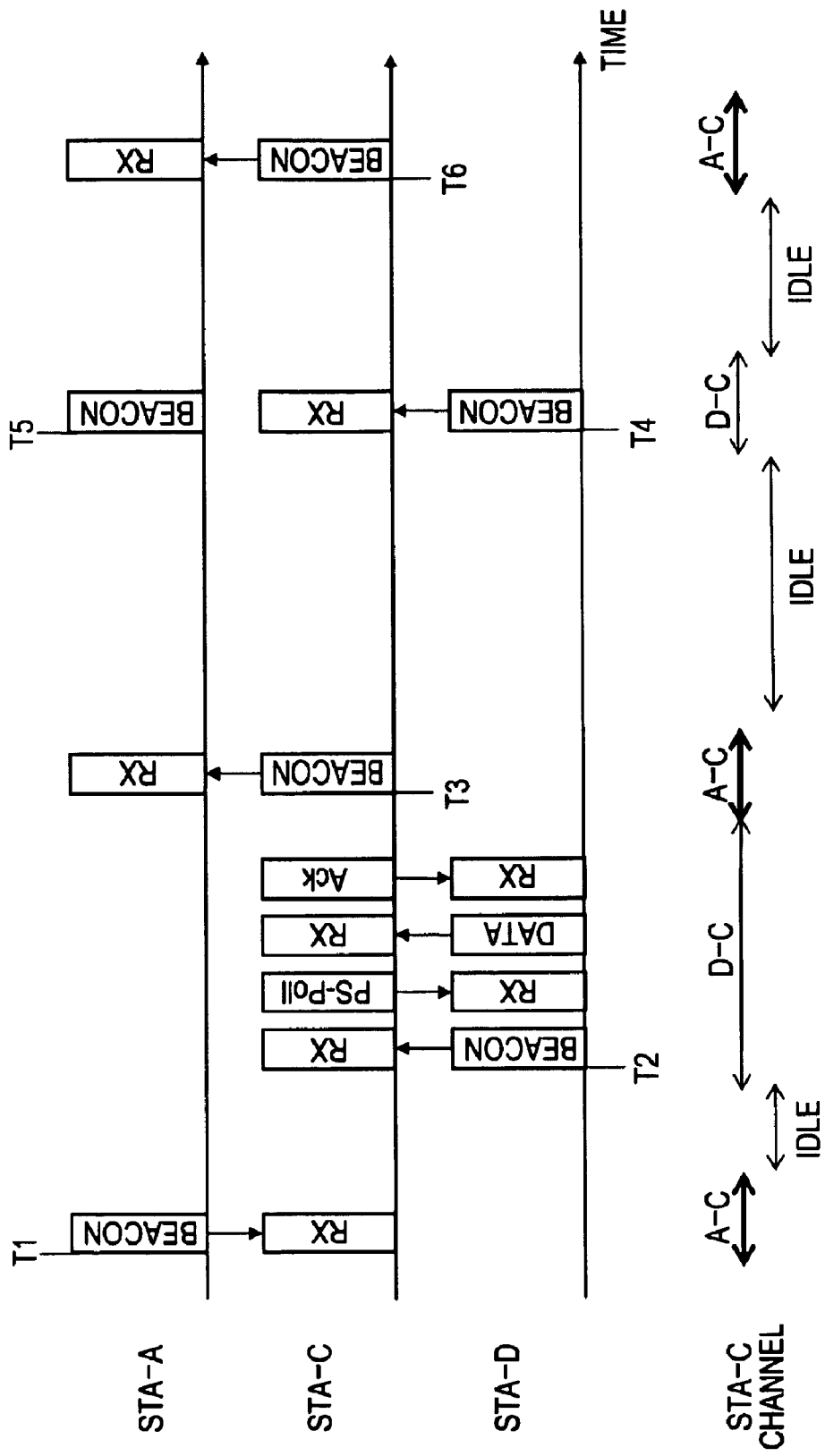
FIG. 9 illustrates another exemplary communication sequence occurring in the communication system shown in FIG. 18, in the case where the station STA-C is simultaneously participating in a network A as an MT or MP in an autonomous distributed manner, while also communicating with an access point STA-D on a network D operating in infrastructure mode.

FIG. 9 illustrates another exemplary communication sequence occurring in the communication system shown in FIG. 18, in the case where the station STA-C is simultaneously participating in the network A as an MT or MP in an autonomous distributed manner, while also being accommodated by an access point STA-D on the network D operating in infrastructure mode. Furthermore, the network A and the network D are herein taken to operate on different frequency channels (same as above).

The access point STA-D periodically transmits beacons on network D. In the exemplary communication sequence shown in FIG. 9, STA-D transmits beacons at the times T2 and T4. On the autonomous distributed network A, the station STA-C belonging thereto also periodically transmits beacons. In the exemplary communication sequence shown in FIG. 9, STA-C transmits beacons at the times T3 and T6. Similarly, the station STA-A also periodically transmits beacons on the network A. In the exemplary communication sequence shown in FIG. 9, STA-A transmits beacons at the times T1 and T5. The lower part of FIG. 9 illustrates how, in such conditions, the STA-C participates in both networks and fulfills dual roles by selecting frequency channels and attempting to receive signals.

When STA-A's beacon transmit time T1 approaches, the station STA-C sets its receiver to the channel used in the link A-C, and attempts to receive the beacon arriving from STA-A. Subsequently, upon analyzing the beacon received at time T1 and discovering that there is no incoming traffic addressed to itself, the station STA-C turns its receiver off and enters an idle state in order to reduce power consumption.

Next, when STA-D's beacon transmit time T2 approaches, the station STA-C sets its receiver to the channel used in the link D-C, and then receives the beacon arriving from STA-D. Upon analyzing the received beacon information and discovering the existence of incoming traffic addressed to itself, the station STA-C transmits a PS-Poll frame addressed to STA-D and announcing that STA-C is ready to receive the traffic addressed to itself. In response to receiving the PS-Poll frame, the STA-D then transmits its buffered data frames to STA-C.

Subsequently, upon reaching the time T3, the STA-C transmits a beacon over the network A on the frequency channel of the link A-C, and then activates its receiver on the frequency channel of the link A-C for an amount of time equal to the listen period. The station STA-C does not receive a signal during the listen period, and thus turns its receiver off and enters an idle state in order to reduce power consumption.

At this point, the station STA-C would normally receive a beacon from STA-A on the network A at the time T5, while also receiving a beacon from STA-D at the time T4. However, the station STA-C detects that the time T4 and the time T5 are in close proximity to one another and chronologically overlap. In such cases, the station STA-C refers to the traffic history up to this point, and decides which channel upon which to receive a beacon.

In the example shown in FIG. 9, traffic exchange is occurring more frequently with STA-D than with STA-A, the reverse of that shown in FIG. 3. Consequently, the station STA-C prioritizes reception of the beacon from STA-D, activating its receiver on the channel used in the link D-C prior to the time T4, and receiving the beacon from STA-D. In so doing, the station STA-C is able to maintain communication on the network D.

In addition, the station STA-C also fails to receive the beacon from STA-A at time T5 as a result of prioritizing reception of the beacon from the station STA-D. Even assuming that STA-A had been buffering traffic addressed to STA-C, the effects of the station STA-C failing once to receive the beacon merely cause the delivery of traffic addressed to STA-C from STA-A to be delayed by an amount of time equal to the beacon transmit period. Moreover, since the probability of traffic being generated on network D is itself projected to be low, the above is not thought to pose a significant problem.

In either of the communication sequences shown in FIGS. 8 and 9, the dual role station STA-C is configured such that, when the times for receiving beacons from other stations overlap on both the network A and the network D in which STA-C is participating, STA-C decides to prioritize, on the basis of past traffic history, reception of the beacon for the network more likely to generate future traffic. In so doing, it is projected that the probability of traffic congestion occurring will also be low.

In some cases, the beacon transmit times from other stations on both network A and D may overlap. In such cases, if there exists an event occurring on one of the networks that can be detected by some procedure other than inspection of past traffic history (such as the scheduled transmission of broadcast traffic or multicast traffic, for example), then the dual role station STA-C may also be configured to prioritize reception of the scheduled broadcast traffic or multicast traffic, rather than following the above procedure based on traffic history.

As already described with reference to the exemplary communication sequence shown in FIG. 6, even if the station STA-C has confirmed that there still exist buffered data frames in the access point STA-D, STA-C-may abort the reception of succeeding packets because of the scheduled reception of a signal on the other network A. The processing for deciding the above that is conducted in the dual role station will hereinafter be described in detail.

In the description of the related art, it was noted that there exist two types of poll frames for triggering transmission by another station: a type # A poll frame that triggers transmission of just one packet, and a type # B poll frame that triggers transmission of a plurality of packets. Although the PS-Poll frame indicated in the exemplary communication sequences shown in FIGS. 6 to 9 corresponds to using the type # A poll frame, it is of course also possible to use the type # B poll frame.

The station STA-C decides to use either a type # A or a type # B poll frame with respect to another station buffering traffic addressed to STA-C, and is thereby able to abort or continue reception of succeeding packets.

Figure 10:
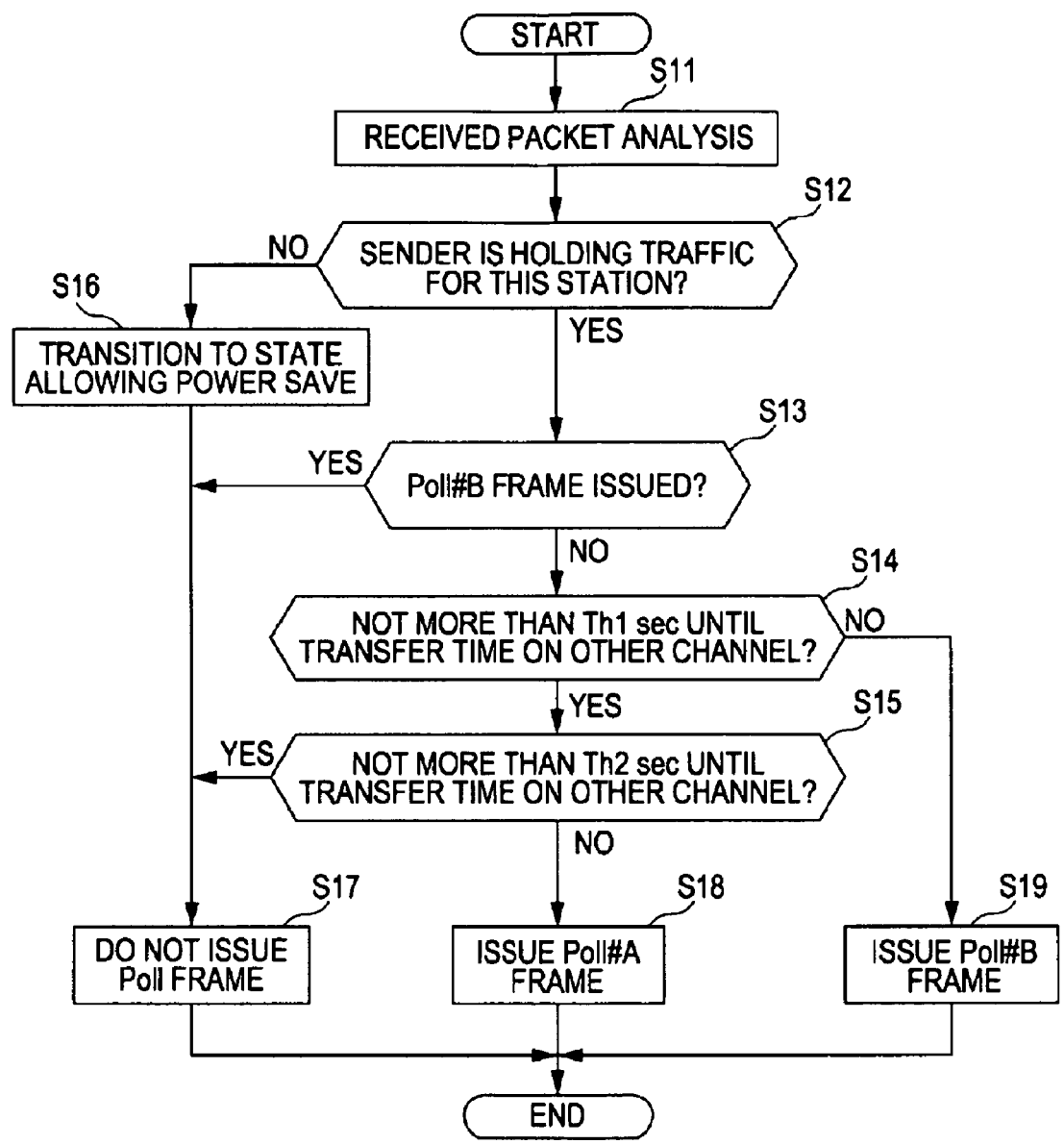
FIG. 10 is a flowchart illustrating a processing sequence whereby a dual role device decides to transmit either a type # A or type # B poll frame with respect to another station buffering traffic addressed to itself.

FIG. 10 illustrates a processing sequence in flowchart form, whereby a dual role station decides to transmit either a type # A or type # B poll frame with respect to another station buffering traffic addressed to itself.

Upon receiving a given packet (step S11), the station checks whether or not the other station is buffering traffic addressed to itself (step S12).

For example, if the received packet is a beacon, then the station is able to check whether or not the other station is buffering traffic addressed to itself by analyzing the TIM (Traffic Indication Map). If the received packet is a data packet, then the station checks the header information for a field indicating an intent to transmit succeeding packets.

If the other station is not buffering traffic addressed to the station in question (step S12: No), then the station has nothing to receive from the other station and thus transitions to a state allowing low-power operation (step S16). (In some cases, the station might not enter Sleep mode for another reason.) In the above case, the station does not issue a poll frame (step S17).

If the other station is buffering traffic addressed to the station in question (step S12: Yes), then the station continues to operate without entering Sleep mode. In this case, the station then checks whether or not a type # B poll frame allowing transmission of multiple packets has already been transmitted to the other station (step S13).

If a type # B poll frame has already been transmitted (step S13: Yes), then the station has nothing further to tell the other station, and thus does not issue a poll frame (step S17).

In contrast, if a type # B poll frame has not yet been transmitted (step S13: No), then the station attempts to transmit one of either type of poll frame. At this point, the station determines approximately how long it can remain on the channel currently set. In other words, the station decides whether to transmit a type # A or type # B poll frame according to the amount of time remaining until the next scheduled transmit or receive time on the other channel.

First, the station determines whether or not it can continuously remain on the current channel for Th1 sec or more (step S14). If the station can continuously remain on the current channel for Th1 sec or more (step S14: No), then the station transmits a type # B poll frame (step S19), thereby allowing the other station to subsequently transmit multiple packets. Th1 herein represents an amount of time amply sufficient to receive a plurality of packets.

On the other hand, if the station might not be able to continuously remain on the current channel for Th1 sec or more (step S14: Yes), then the station additionally determines whether or not it can continuously remain on the current channel for Th2 sec or more (step S15). Th2 herein represents an amount of time amply sufficient to receive a single packet, wherein Th1 is greater than Th2.

At this point, if the station is able to continuously remain on the current channel for Th2 sec or more (step S15: No), then the station transmits a type # A poll frame allowing the other station to transmit a single packet (step S18), and then attempts to receive the packet from the other station. The station then prepares for the transmit or receive event scheduled on the other channel.

On the other hand, if the station might not be able to continuously remain on the current channel for Th2 sec or more (step S15: Yes), then the station postpones reception of succeeding packets from the other station and prioritizes the transmit or receive event on the other channel. For this reason, the station does not issue a poll frame in this case (step S17). However, upon termination of the event on the other channel, the station once again returns to the current channel and initiates the procedure for receiving packets from the other station.

The foregoing thus describes the present invention in detail and with reference to specific embodiments. However, it should be apparent to those skilled in the art that various modifications and substitutions may also occur without departing from the scope and spirit of the present invention.

Although the present specification primarily describes an embodiment applied to a wireless LAN system such as that specified in IEEE 802.11, it should be appreciated that the scope of the present invention is not limited to the above, and that the present invention can be similarly applied to a variety of types of wireless communication environments made up of several different logical network topologies.

In short, the present invention has been disclosed herein by means of examples, and the content of the present specification is not to be interpreted as limiting the scope of the present invention. Rather, the scope of the present invention is to be determined when taken in conjunction with the appended claims.

The present application contains subject matter related to that disclosed in Japanese Priority Patent Application JP 2008-079576 filed in the Japan Patent Office on Mar. 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus, comprising:
   a transmitter that transmits wireless signals;
   a receiver that receives wireless signals;
   a first communication functional unit that uses the transmitter and the receiver to operate as a station in a first network operating on a first communication channel;
   a second communication functional unit that uses the transmitter and the receiver to operate as a station in a second network operating on a second communication channel different from the first communication channel; and
   a controller that conducts time division data transfer by utilizing inactive time periods of receiver on the first and second channels in order to switch operation from one of the first channel or the second channel to the other channel to receive a signal on the corresponding other network,
   wherein the first and the second communication functional units are fundamentally operative to respectively originate and transmit beacon signals on the first and second channels each time when a first predetermined beacon period elapses, or alternatively, to respectively receive beacon signals transmitted from neighboring stations on the first and second channels each time when a second predetermined beacon period elapses; and
   wherein the controller controls the time division data transfer such that, when times to receive the beacon signals on the first and second networks overlap, the controller prioritizes reception of a beacon signal for one of the first or second network whereon signals of greater bandwidth are being transferred.

2. he communication apparatus according to claim 1, wherein the controller controls the time division data transfer so as to prioritize transmission of its own beacon signal over reception of a beacon signal from one of the first or second network when times of the transmission of its own beacon signal and the reception of a beacon signal overlap.

3. The communication apparatus according to claim 1, wherein the controller manages scheduled times for data transfer on the first and second network such that, upon discovering that another station on the first network is buffering traffic addressed to the apparatus, the controller modifies the activation procedure for receiving data according to the amount of time remaining until the next scheduled transfer time on the second network.

4. The communication apparatus according to claim 3, wherein, when the amount of time remaining until the next scheduled transfer time on the second network is amply sufficient to receive a plurality of packets, the controller activates a procedure for receiving data that allows the other station buffering traffic addressed to the apparatus to transmit multiple packets on the first network.

5. The communication apparatus according to claim 3, wherein, when the amount of time remaining until the next scheduled transfer time on the second network is amply sufficient to receive a single packet, the controller activates a procedure for receiving data that allows the other station buffering traffic addressed to the apparatus to transmit a single packet on the first network.

6. A communication method, comprising the steps of:
   communicating as a station in a first network operating on a first communication channel;
   communicating as a station in a second network operating on a second communication channel different from the first communication channel;
   conducting time division data transfer by utilizing inactive time periods of receiver on the first and second channels in order to switch operation from one of the first channel or the second channel to the other channel to receive a signal on the corresponding other network;
   transmitting and receiving beacon signals on the first and second channels each time when predetermined beacon periods elapse; and
   when times to receive beacon signals on both the first and second network overlap, prioritizing reception of a beacon signal for one of the first or second network whereon signals of greater bandwidth are being transferred.

7. The communication method according to claim 6, further comprising the step of:
   prioritizing transmission of a first beacon signal over reception of a second beacon signal when times of the transmission of the first beacon signal and the reception of the second beacon signal overlap.

8. The communication method according to claim 6, further comprising the steps of:
   managing scheduled times for data transfer on the first and second networks; and
   upon discovering that another station on the first network is buffering traffic addressed to an apparatus executing the method, modifying the activation procedure for receiving data according to the amount of time remaining until the next scheduled transfer time on the second network.

9. The communication method according to claim 8, wherein, in the modifying step, when the amount of time remaining until the next scheduled transfer time on the second network is amply sufficient to receive a plurality of packets, a procedure is activated for receiving data that allows the other station buffering traffic addressed to the apparatus executing the method to transmit multiple packets on the first network.

10. The communication method according to claim 8, wherein, in the modifying step, when the amount of time remaining until the next scheduled transfer time on the second network is amply sufficient to receive a single packet, a procedure is activated for receiving data that allows the other station buffering traffic addressed to the apparatus executing the method to transmit a single packet on the first network.

11. A non-transitory computer-readable storage medium storing instructions which, when executed by a computer, cause the computer to control communication operations using transceiver that transmits and receives wireless signals, and cause the computer to function as:
- a first communication functional unit that uses the transceiver to operate as a station in a first network operating on a first communication channel;
- a second communication functional unit that uses the transceiver to operate as a station in a second network operating on a second communication channel different from the first communication channel; and
- a controller that conducts time division data transfer by utilizing inactive time periods of receiver on the first and second channels in order to switch operation from one of the first channel or the second channel to the other channel to receive a signal on the corresponding other network, wherein the first and the second communication functional units are fundamentally operative to respectively originate and transmit beacon signals on the first and second channels each time when a first predetermined beacon period elapses, or alternatively, to respectively receive beacon signals transmitted from neighboring stations on the first and second channels each time when a second predetermined beacon period elapses; and wherein the controller controls the time division data transfer such that, when times to receive beacon signals on both the first and second networks overlap, the controller prioritizes reception of a beacon signal for one of the first or second network whereon signals of greater bandwidth are being transferred.

* * * * *